United States Patent Office 3,775,471
Patented Nov. 27, 1973

3,775,471
NOVEL PHENANTHRENE-2-CARBOXYLIC ACIDS AND DERIVATIVES THEREOF
John A. Edwards, Los Altos, and John H. Fried, Palo Alto, Calif., assignors to Syntex Corporation, Panama, Panama
No Drawing. Continuation-in-part of application Ser. No. 638,648, May 15, 1967, now Patent No. 3,657,329. This application Sept. 25, 1967, Ser. No. 670,421
Int. Cl. C07c 63/44, 65/14, 69/76
U.S. Cl. 260—514.5                          10 Claims

ABSTRACT OF THE DISCLOSURE

Novel phenanthrene-2-carboxylic acids and derivatives thereof, processes and intermediates for the synthesis of cis and trans racemates of said phenanthrene-2-carboxylic acids having estrogenic activity.

---

This is a continuation-in-part of U.S. application Ser. No. 638,648, filed May 15, 1967, now Pat. No. 3,657,329.

The present invention relates to novel phenanthrene-2-carboxylic acids and derivatives thereof, processes and intermediates useful for the synthesis of said phenanthrene-2-carboxylic acids. More particularly, this invention relates to cis and trans racemates of novel phenanthrene-2-carboxylic acid and derivatives thereof represented by the General Formula (A'):

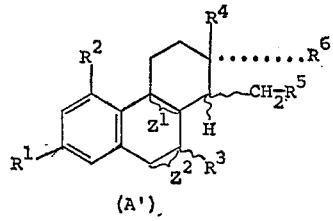

(A')

wherein, $R^1$ is hydrogen, hydroxy, lower alkoxy, lower acyloxy, cyclopentyloxy, cyclohexyloxy, tetrahydrofuran-2-yloxy or tetrahydropyran-2-yloxy;

$R^2$ is lower alkyl, hydrogen, hydroxy, lower alkoxy, lower acyloxy, cyclopentyloxy, cyclohexyloxy, tetrahydrofuran-2-yloxy or tetrahydropyran-2-yloxy;

$R^3$ is hydrogen, methyl or ethyl;

$R^4$ is hydrogen, fluoro, chloro, bromo, hydroxy and the lower carboxylic acid esters thereof, lower alkoxy, acetyl, cyano, fluoromethyl, chloromethyl, bromomethyl, difluoromethyl, dichloromethyl, trifluoromethyl, trichloromethyl, phenyl, benzyl, formyl, hydroxymethyl and the lower carboxylic acid ester thereof the group

wherein R is hydrogen or lower alkyl;

$R^5$ is hydrogen, methyl, ethyl or propyl;

$R^6$ is hydroxymethyl and the lower carboxylic acid esters thereof, formyl,

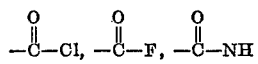

or the group

wherein

R is hydrogen or lower alkyl;

$Z^1$ is a carbon-carbon single bond or double bond between C–11 and C–12; and $Z^2$ is a carbon-carbon single bond or double bond between C–9 and C–10, provided that when $Z^2$ is a double bond that $Z^1$ is a double bond.

The term "lower alkyl," as used herein, means a straight or branched chain hydrocarbon group of up to six carbon atoms, inclusive, such as methyl, ethyl, isopropyl, n-hexyl, and the like. The term "lower alkoxy" means the group—OAlk wherein Alk is lower alkyl as defined hereinabove. The term "lower acyloxy" or "lower acyl" means a hydrocarbon carboxylic acyloxy or acyl group containing up to six carbon atoms, inclusive, and is of a straight or branched chain structure such as acetoxy, propionoxy, trimethylacetoxy, acetyl, propionyl, butyryl, and the like. The wavy lines "⌇" at the 1-position of the phenanthrene nucleus indicates alpha or beta configuration, i.e. the dl-cis and dl-trans isomers of the above formula. The wavy line "⌇" at the 10-position of the phenanthrene nucleus indicates alpha or beta configuration for the $R^3$ substituent.

An object of the present invention is to provide novel phenanthrene-2-carboxylic acids and derivatives thereof of the above Formula A' and efficient processes for the synthesis of cis and trans racemates of said phenanthrene-2-carboxylic acids and derivatives thereof. Another object is to provide valuable key intermediates having the desired stereo-chemistry for the preparation of these acids and derivatives thereof. Additional objects and other meritorious features of the present invention will become apparent as the invention is described hereinafter in detail and from the appended claims.

In accordance with the present invention, compounds of Formula A' above are prepared according to the processes outlined in Chart B below.

CHART B

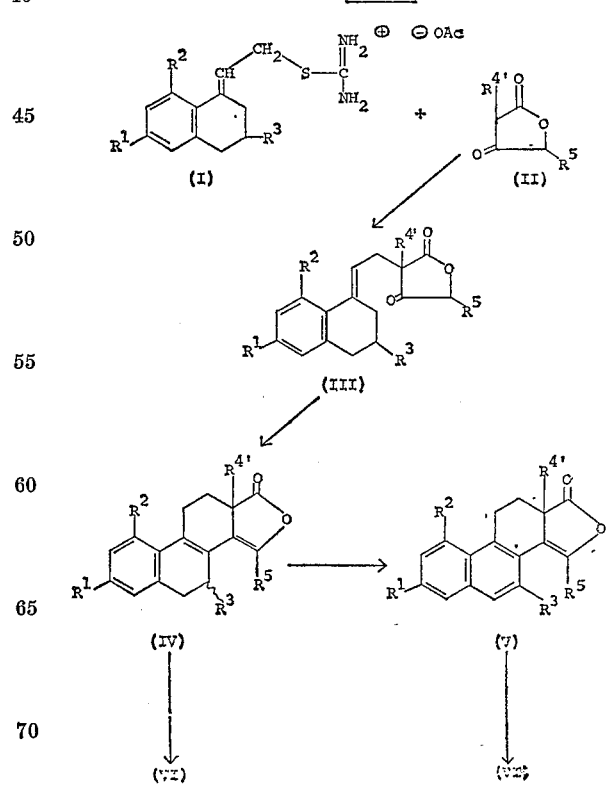

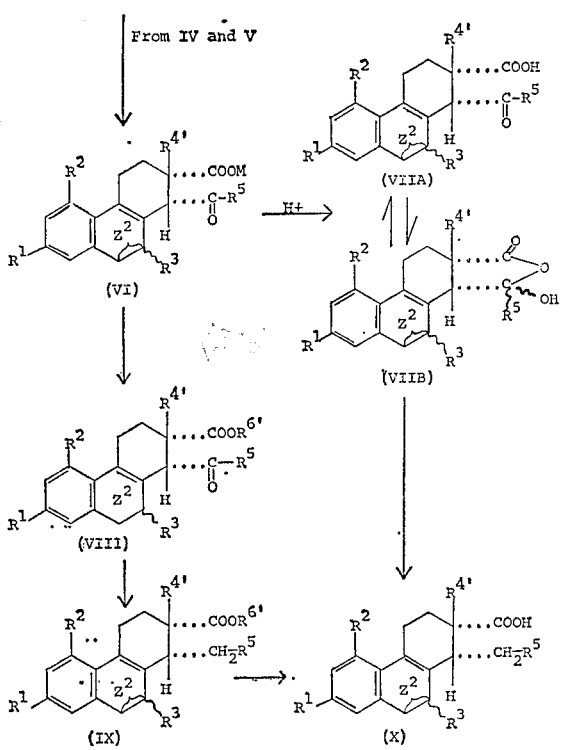

wherein M is potassium or sodium; $R^{4'}$ is hydrogen, fluoro, chloro, bromo, hydroxy and the lower carboxylic acid esters thereof, lower alkoxy, acetyl, cyano, trifluoromethyl, trichloromethyl, phenyl, benzyl or the group $$-\overset{O}{\underset{\|}{C}}-OR$$

wherein R is hydrogen or lower alkyl; and $R^{6'}$ is lower alkyl; and all other substituents are as defined hereinabove.

In the practice of the processes as outlined in Chart B, an isothiouronium acetate salt of Formula I is commingled with, and reacted with, a tetronic acid of Formula II in an aqueous solution of a water-miscible organic solvent such as methanol, ethanol, diethylene glycol monoethyl ether, diethylene glycol dimethyl ether, tetrahydrofuran, and the like, at about room temperature for a period of from about 1 to 40 hours to afford a tricyclic compound of Formula III. Preferably, the isothiouronium salt is condensed with the tetronic acid at room temperature in aqueous ethanol for a period of about 16 hours.

A tricyclic compound of Formula III is then contacted with an acid, preferably a strong acid, either alone or in an organic solvent inert to the reaction such as benzene, xylene, dioxane, and the like at a temperature of from about room temperature to the reflux temperature of the solvent for a period of about 1 to 12 hours to form a tetracyclic enol lactone of Formula IV. Exemplary of the inorganic and organic acids suitable for this reaction are p-toluenesulfonic acid, sulfosalicylic acid, anhydrous or thophosphoric acid, sulfuric acid, formic acid, and the like. Preferably, this ring cyclization is effected by treatment with p-toluenesulfonic acid in benzene at reflux for about four hours.

A tetracyclic enol lactone of Formula IV is then converted into either the corresponding 6,7-dehydro compound (V) or a keto acid salt of Formula VI (VI, $Z^2$ is a single bond).

Conversion of a tetracyclic enol lactone (IV) into the corresponding 6,7-dehydro (V) is accomplished by heating the tetracyclic enol lactone in an organic solvent inert to the reaction in the presence of a palladium catalyst such as palladium-on-charcoal, palladium on barium sulfate, and the like, either alone or in the presence of a hydrogen acceptor such as maleic acid or the like. Suitable organic solvents include benzene, xylene, and the like.

Conversion of a tetracyclic enol lactone of Formula IV into a novel cis keto acid salt of Formula VI (VI, $Z^2$ is a single bond) is carried out by treatment with an aqueous water-miscible organic solvent solution of a base such as the alkali metal hydroxides, e.g. sodium hydroxide or potassium hydroxide, at about room temperature for a period of about one to three hours. In this conversion, caustion must be exercised with regard to the reaction time in that by using a reaction time of three hours or less there is obtained the cis keto acid salt whereas reaction times extending beyond about three hours lead to formation of the trans keto acid salt, or in other words, formation of the trans keto acid salt is increasingly promoted as the reaction time extends beyond three hours. Similarly, a 6,7-dehydro of the tetracyclic enol lactone of Formula IV, i.e. a compound of Formula V is converted into a novel cis keto acid salt of Formula VI wherein $Z^2$ is a double bond by treatment with an aqueous water-miscible organic solvent solution of a base. Suitable organic solvents include ethanol, dioxane, and the like.

In carrying out the reactions outlined above (VI→VIII→IX→X), a cis keto acid salt of Formula VI is first subjected to esterification to obtain a cis keto ester of Formula VIII. The esterification is accomplished by treatment of a compound of Formula VI with a lower alkyl halide, preferably a bromide or iodide, containing up to six carbon atoms, e.g. methyl iodide, methyl bromide, and the like, in an organic solvent such as dimethylacetamide or dimethylformamide at about room temperature for from about 1 to about 10 hours.

A cis keto ester of Formula VIII is then subjected to carbonyl reduction. Carbonyl reduction of the cis keto ester can be accomplished by, for example, a Wolff-Kishner reduction, a Clemmensen reduction, thioketal formation followed by treatment with Raney nickel, or an electrochemical reduction in an electrolytic cell. For example, a cis keto ester of Formula VIII is treated with a mixture of hydrazine hydrate and hydrazine hydrochloride in diethylene glycol diethyl ether at about 145° C. for a period of about three hours to afford an intermediate hydrazone. The latter intermediate is then treated with potassium hydroxide in ethylene glycol at about 180° C. or diethylene glycol at about 220° C. to afford a cis acid (X). Alternatively, a cis keto ester is reduced with amalgamated zinc and an acid such as hydrochloric acid, acetic acid or the like, to afford a cis ester of Formula IX. Alternatively, a cis keto ester is treated with ethanedithiol at room temperature in the presence of boron trifluoride etherate, either alone or in an acetic acid solution, to afford a thioketal intermediate. Desulfurization of the latter intermediate with Raney nickel affords the cis ester (IX). This method is particularly useful when $R^{4'}$ is halo or lower alkoxy.

In the electrochemical method, reduction of a cis keto ester of Formula VIII is effected at the cathode of a divided electrolysis cell in an electrolytic medium comprising mineral acid electrolyte, water and a water-miscible inert organic solvent at a current density of about 0.01 to about 0.2 amps./cm.² and at a temperature of from about 0° C. to about 70° C., for a period of about 1 to about 16 hours. Mineral acids suitable for the electrolytic medium are sulfuric acid, hydrochloric acid, chloric acid, hydrobromic acid, phosphoric acid, and the like. Preferably, sulfuric acid or perchloric acid. Water-miscible organic solvents inert to the electrolysis reaction suitable for the electrolytic medium are ethers such as dioxane, tetrahydrofuran, and the like, lower monohydric alcohols such as methanol, ethanol, and the like, lower alkylene glycols such as ethylene glycol, propylene glycol, and the like, mixtures of the foregoing solvents, and the like in which the cis keto ester is soluble or substantially soluble.

The amount of solvent present in the electrolytic medium can range from that amount which is sufficient to dissolve or substantially dissolve the keto ester up to about 94%, preferably from about 20% to about 85%, by weight, of the total electrolytic medium. The amount of acid in the medium can range from about 1% to about 20%, by weight, of the total electrolytic medium, preferably from about 2% to about 15%. The amount of water in the medium should be at least 5%, by weight, of the total electrolytic medium, preferably from about 10% to about 75%. A preferred medium is an equal volume of the inert organic solvent and an equal volume of 10% to 30% aqueous sulfuric acid, by weight.

Cathode materials useful in the process of the electrochemical reduction include the high hydrogen over-voltage materials such as lead, cadmium, mercury, and the like. The cathode may be in any number of physical forms but preferably in a form having a high surface such as a sheet or a wire mesh which is sufficiently rigid to be used as a stirring means. Anode materials useful for this reduction are difficultly oxidizable conductors such as carbon, platinum, iron, lead, and the like. In general, the anode material may be any conductor which is not attacked by the electrolytic medium in a manner which would transform it into a soluble state over a short period.

In reducing the cis keto ester electrochemically, a current density of about 0.01 to about 0.2 amps./cm.$^2$, preferably from about 0.02 to about 0.1 can be used. Depending primarily upon the current efficiency of the system, reduction times of about 1 to about 16 hours are generally employed. A temperature within the raneg of about 5° C., to about 40° C. is preferred.

The cis ester of Formula IX is then converted into the cis acid of Formula X by alkaline hydrolysis. This conversion can be accomplished by treatment with an alcoholic solution of an alkali metal hydroxide such as sodium hydroxide or potassium hydroxide in methanol or ethanol at an elevated temperature, for example, about 180° C., for a few minutes to several hours, for example, from about 30 minutes to about four hours or more followed by acidification with an inorganic or organic acid, e.g. an aqueous solution of hydrochloric acid.

An ester of Formula IX or an acid of Formula X wherein $Z^2$ is carbon-carbon single bond can be reduced to provide the corresponding 1,2,3,4,9,10,11,12-octahydro compound of Formula A' wherein each of $Z^1$ and $Z^2$ is a single bond and $R^6$ is the group

wherein R is hydrogen or lower alkyl. This reduction can be carried out using an alkali metal such as metallic potassium or sodium in liquid ammonia.

As an alternative to the above described route (VI→VIII→IX→X) for preparation of the phenanthrene-2-carboxylic acids of Formula X, there can be used the route outlined in Chart B about of VI→VIII(A+B)→X.

In carrying out the reactions outlined above of VI→VII(A+B)→X, a cis keto acid salt of Formula VI is acidified with an organic or inorganic acid to afford an equilibrium mixture of a tautomeric cis keto acid of Formula VIIA and cis lactol of Formula VIIB. This equilibrium mixture is predominantly the cis lactol and for the sake of clarity and to avoid undue prolixity hereinafter reference to the cis lactol is understood to be inclusive of the cis keto acid, i.e. the equilibrium mixture. This conversion or acidification can be carried out using, for example, an aqueous solution of an organic or inorganic acid such as an aqueous solution of hydrochloric acid or the like at about room temperature. This conversion or acidification can be carried out by treating either an isolated cis keto acid salt of Formula VI or by acidification of the reaction medium in which VI is present after treating a compound of Formula IV or V with an alkali metal hydroxide and therefater isolating a thus-obtained cis lactol.

A cis lactol of Formula VII is then subjected to carbonyl reduction to afford a cis acid of Formula X. This carbonyl reduction can be carried out using, for example, the carbonyl reduction methods described hereinabove in the conversion of a compound of Formula VIII into a compound of Formula IX. Preferably, the cis lactol is subjected to carbonyl reduction by the electrochemical means described above.

In the practice of the processes as outlined in Chart B, acid labile groups in a compound of Formula I or III, i.e. wherein either $R^1$ or $R^2$ or both is a tetrahydropyran-2'-yloxy or tetrahydrofuran-2'-yloxy group, are generally hydrolyzed in the course of the condensation and ring cyclization reactions to free hydroxy groups. The free hydroxy group(s) is reetherified subsequently, if desired, by treatment with dihydropyran or dihydrofuran and an acid catalyst such as p-toluenesulfonic acid either alone or in a cosolvent such as benzene to yield the corresponding 1- or 3-mono or 1,3-ditetrahydropyran-2'-yloxy or tetrahydrofuran-2'-yloxy substituted enol lactone of Formula IV.

In addition, base labile groups in a compound of Formulas IV, V or IX, i.e. wherein either $R^1$ or $R^2$ or both is a hydrocarbon carboxylic acyloxy group, are hydrolyzed in the course of the alkaline hydrolysis reactions to free hydroxy groups which are reesterified subsequently, if desired.

In addition, acid labile groups in a compound of Formulas VII (A and B) or VIII, i.e. wherein either $R^1$ or $R^2$ or both is tetrahydropyran-2'-yloxy or tetrahydrofuran-2'-yloxy are hydrolyzed in the course of the electrochemical reduction to free hydroxy groups. The free hydroxy groups are reetherified subsequently, if desired, as described hereinabove.

The compounds of the present invention of Formula A' wherein $R^4$ is hydroxymethyl can be prepared by treating a tricyclic compound of Formula III wherein $R^{4'}$ is hydrogen, for example α-[2-(6-methoxy-1,2,3,4-tetrahydronaphthyliden)ethyl]-γ-methyl tetronic acid, with formaldehyde and sodium methoxide in the presence of sodium hydroxide in aqueous dioxane and thereafter subjecting the thus-prepared α-hydroxymethyl substituted tricyclic compound to the process steps described above for the preparation of the free acid X. Alternatively, the hydroxymethyl group can be introduced at a later stage in the process. For example, subjecting a compound of Formula IX wherein $R^{4'}$ is hydrogen to the above treatment with formaldehyde and sodium methoxide to obtain the corresponding 2-hydroxymethyl substituted compound.

The novel compounds of Formula A' wherein $R^4$ is fluoromethyl, chloromethyl or bromomethyl can be obtained by treatment of a hydroxymethyl substituted tricyclic compound of Formula III (III ,$R^{4'}$ is hydroxymethyl) with N-(2-chloro-1,1,2-trifluoromethyl)diethylamine, thionyl chloride, and phosphorus tribromide, respectively and thereafter subjecting the thus-prepared α-fluoromethyl, α-chloromethyl or α-bromomethyl tricyclic compound to the process steps described above for the preparation of the free acid X. Alternatively, a halomethyl group can be introduced at a later stage in the process by treatment of the corresponding hydroxymethyl substituted compound.

The novel compounds of Formula A' wherein $R^4$ is formyl can be obtained by treating a hydroxymethyl substituted compound with N,N'-dicyclohexylcarbodiimide in dimethyl sulfoxide in the presence of acid or with chromic oxide in pyridine. The conversion of a hydroxymethyl group to a formyl group is preferably accomplished using a 2-hydroxymethyl substituted ester of Formula IX (IX, $R^{4'}$ is hydroxymethyl) and thereafter converting the ester into the free acid X ($R^{4'}$ is formyl).

The 2-difluoromethyl and 2-dichloromethyl compounds of the present invention (A', R⁴ is difluoromethyl or dichloromethyl) are obtained by treating a 2-formyl substituted compound with sulfur tetrafluoride and phosphorus pentachloride, respectively. This conversion can be accomplished at any stage of the process but is preferably accomplished using a 13-formyl substituted compound of Formula IV or V (R⁴' is formyl) and thereafter subjecting the thus-obtained 13-difluoromethyl compound or 13-dichloromethyl compound to the above described process for the conversion of a compound of Formula IV or V into the free acid X.

As alternative to the processes outlined in Chart B and described above, a tetracyclic enol lactone of Formula XI can be converted directly into the free acid XII which can be shown as follows.

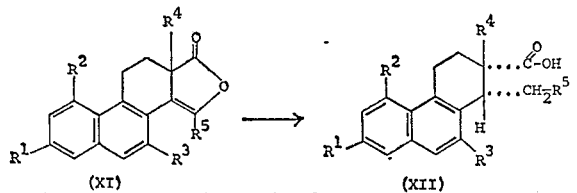

In the above formulas, R¹, R², R³, R⁴ and R⁵ have the same meaning as set forth above. In practicing the above process, an enol lactone of Formula XI is treated with platinum oxide catalyst in ethyl acetate at room temperature for a period of about 18 hours. The reaction also affords a 14β-H lactone of Formula XIII which can be separated from the cis acid of Formula XII by, for example, preparative chromatography.

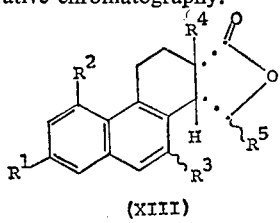

A process which is especially useful for the preparation of trans racemates of Formula A' is to treat a tetracyclic enol lactone of Formula XIV with an aqueous water-miscible organic solvent solution of an alkali metal hydroxide, e.g. sodium or potassium hydroxide, at about room temperature for a period of about 36 hours to about 48 hours to obtain a trans keto acid of Formula XV together with a minor amount of an equilibrium mixture of the cis lactol. The trans keto acid can be isolated at this point, if desired, by fractional crystallization. This process can be illustrated as follows.

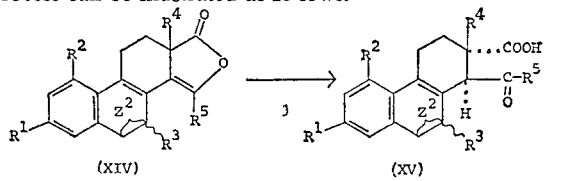

Thereafter, by repeating the procedures described hereinabove using the thus-obtained trans racemate of Formula XV as the starting material, there is obtained the trans acid of Formula XVI, that is

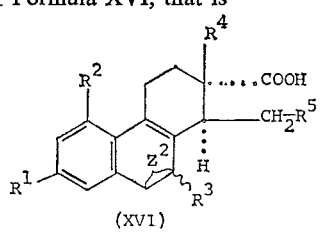

This conversion of XV→XVI can be accomplished using the carbonyl reduction procedures described hereinabove in connection with Chart B. In the foregoing formulas, R¹, R², R³, R⁴, R⁵ and Z² have the same meaning as set forth above.

The novel acid chlorides of the present invention (A', R⁶ is

are obtained by treating the free acid with triphenyl phosphine in carbon tetrachloride or by treatment with thionyl chloride or oxalyl chloride in an inert halogenated solvent such as chloroform or methylene chloride at about room temperature for from about 1 to 12 hours.

The compounds of the present invention of Formula A' wherein R⁶ is

are obtained by treating the free acid with N-(2-chloro-1,1,2-trifluoroethyl)diethylamine in an inert solvent such as ether, acetonitrile or methylene chloride at a temperature of about 0° C. to about reflux for from 1 to 10 hours.

The novel amides of the present invention (A', R⁶ is

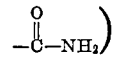

are obtained by treating the free acid with thionyl chloride in benzene at about reflux followed by treatment with anhydrous ammonia at about room temperature.

The compounds of the present invention of Formula A' wherein R⁶ is hydroxymethyl are prepared by treating the ester (A', R⁶ is

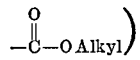

with, for example, lithium aluminum t-butoxide, in an inert solvent such as tetrahydrofuran. The hydroxymethyl derivative can then be converted into the novel 2-formyl compounds (A', R⁶ is formyl) by procedures described hereinabove, e.g. by treatment with chromic oxide in pyridine.

The phenanthrene-2-carboxylic acids described herein are obtained in the form of their dl-mixtures which can be resolved, if desired, by methods known in the art. For example, the acids form salts with optically active amines such as brucine, cinchonine, menthylamine, morphine, quinidine, quinine and strychnine. Fractional crystallization of the resulting diasteriomeric salts followed by regeneration of the free acids affords the individual d and l enantiomorphs.

In the practice of the present invention, the 7-alkyl (methyl or ethyl) substituted 16-oxa-steroids are obtained as a mixture of the 7α- and 7β-isomers by treatment of the tricyclic compound characterized by Formula III with acid. These isomers can be separated at this point by chromatography or employed in the subsequent reaction steps as a mixture of isomers and separated at a later stage by chromatography or crystallization. In order to avoid undue prolixity in the description following, the designations 7-methyl or 7-ethyl in the case of the steroids and the designations 10-methyl or 10-ethyl in the case of the phenanthrenes is understood to include the individual isomers as well as a mixture of the isomers.

The isothiouronium acetate starting material of Formula I can be obtained by reacting isothiourea with a 1-vinyl-1-tetralol (prepared as described in copending application Ser. No. 638,648, filed May 15, 1967, see for example, Examples 1 and 2 thereof). Alternatively, there can be used a 1-vinyl-1-tetralol as the starting material. For example, a 6-lower alkoxy-1-vinyl-1-tetralol is refluxed with a tetronic acid of Formula II in an aromatic hydrocarbon solvent in the presence of a strong alkaline catalyst under an inert atmosphere for several hours, see U.S. Pat. 3,309,383. Use of an isothiouronium salt of Formula I is preferable in that the reaction proceeds at room temperature, excellent yields are obtained, it is not necessary to use an inert atmosphere, recovery of the tricyclic compound is easier, and it is unnecessary to employ a catalyst.

Tetronic acid and substituted tetronic acid characterized by Formula II can be prepared by conventional procedures known in the art. For example, α-bromo-γ-alkyl tetronic acids can be prepared by bromination of a γ-alkyl tetronic acid in chloroform as described by Briegleb and Strohmeier, Angew. Chem., 64, 409 (952). In an analagous manner, chlorination of a γ-alkyl-tetronic acid in chloroform affords the corresponding α-chloro-γ-alkyl tetronic acids. Alternatively, the α-bromo-γ-alkyl tetronic acids are treated with dry hydrochloric acid in anhydrous ethanol to afford the corresponding α-chloro-γ-alkyl tetronic acids by the procedure described by W. D. Kumler, J. Am. Chem. Soc., 60, 857–859 (1938).

α-Hydroxy-γ-alkyl tetronic acids are prepared by condensation of the sodio derivative of diethyl acetoxymalonate with an α-chloro hydrocarbon carboxylic acid chloride

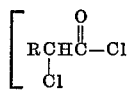

in which R is methyl, ethyl, n-propyl, or isopropyl], subsequent ring closure with hydrolysis and decarboxylation using the method described by Ghose, J. Indian Chem. Soc., 23, 311 (1946).

α-Alkoxy-γ-alkyl tetronic acids are prepared from the corresponding α-hydroxy-γ-alkyl tetronic acids by refluxing the latter in a lower aliphatic alcohol such as methanol, ethanol, propanol, and the like, and in the presence of a strong acidic catalyst such as p-toluenesulfonic acid, for a period of 1 to 24 hours. In addition, the α-methoxy-γ-alkyl tetronic acids can be prepared from the corresponding α-hydroxy-γ-alkyl tetronic acids by methylation with diazomethane to afford a 2,3-dimethyl ether followed by hydrolysis with alkali, i.e. according to the method as described by Micheel and Schulte, Annalen, 519, 70 (1935).

α-Alkoxycarbonyl-γ-alkyl tetronic acids are prepared by condensing equal molar amounts of an α-chloro hydrocarbon carboxylic acyl chloride

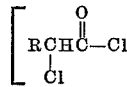

in which R is methyl, ethyl, n-propyl, or isopropyl], with ethyl alkoxymagnesiomalonate to afford an intermediary ethyl α-chloroacylmalonate and the latter intermediate is then cyclized at room temperature or by heating to afford the α-alkoxycarbonyl-γ-alkyl tetronic acids, i.e. according to the method as described by L. J. Haynes et al., J. Chem. Soc., 4661–4664 (1956).

α-Acyl-γ-alkyl tetronic acids are prepared by a Friedel-Craft acylation of the corresponding γ-alkyl tetronic acids such as with a hydrocarbon carboxylic acyl chloride [RCO—Cl in which R is methyl, ethyl, n-propyl, or isopropyl], using catalysts such as aluminum chloride, stannic chloride, zinc chloride, and the like. Preferably acylation of the γ-alkyl tetronic acids is performed at reflux with stannic chloride (1:3 moles), in an excess of the hydrocarbon carboxylic acyl chloride for a period of four hours, i.e. according to the method as described by L. J. Haynes and J. W. M. Jamieson, J. Chem. Soc., 4132–4135 (1958).

α-Benzyl compounds of Formula II are prepared by treating a malonic acid ester

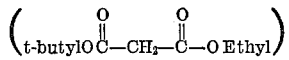

with a molar equivalent of sodium methoxide and benzyl bromide in benzene under reflux for about 18 hours and then treating the thus-obtained benzyl substituted ester with sodium methoxide and an acid chloride [RCOCl in which R is methyl, ethyl, n-propyl, or isopropyl], in benzene at room temperature. The resulting α-benzyl-α-alkyl substituted ester is then refluxed in benzene in the presence of a small amount of p-toluenesulfonic acid to remove the t-butyl group followed by treatment with bromine in ether for about two hours at room temperature, removal of the ether solvent and refluxing of the residue in xylene for about 16–18 hours to afford α-benzyl-γ-alkyl tetronic acid.

α-Phenyl compounds of Formula II are prepared by treatment of phenylacetic acid ethyl ester with a molar equivalent of sodium hydride in benzene under reflux for about one hour followed by treatment with RCOCl, wherein R is methyl, ethyl, n-propyl, or isopropyl, in benzene at about room temperature for about 18 hours. The crude product is then treated with bromine as described above to afford α-phenyl-γ-alkyl tetronic acid.

The phenanthrene-2-carboxylic acids and derivatives thereof of Formula A' of the present invention are valuable therapeutic agents having estrogenic activity. These compounds are useful in veterinary medicine for the treatment of underdeveloped females, in the poultry industry for caponization, and as anti-fertility agents. They can be administered in conjunction with one or more pharmaceutically acceptable excipients, orally or by injection, at a dosage level of from about 5 μg. to about 1.2 mg. per kilogram of body weight per day. Higher or lower dosages are also practical, the most favorable dosage range being determinable by one of ordinary skill in the art giving due consideration to such factors as the age of the animal, the animal's response to initial treatment, the degree or severity of the condition being treated, and the like. Useful pharmaceutical acceptable excipients, solid or liquid, include water, polyalkylene glycols, vegetable oils, lactose talc, magnesium stearate, gelatin, starches, flavoring agents, and the like.

The following examples are provided to illustrate the present invention.

PREPARATION A

To a solution of 1 g. of γ-methyl tetronic acid in 10 ml. of anhydrous chloroform is added dropwise, a solution of 1 ml. of bromine and 10 ml. of anhydrous chloroform. The resulting mixture is allowed to stand at room temperature for a period of one-half hour, washed with 5% aqueous sodium bisulfite. The organic phase is dried and evaporated to dryness under reduced pressure to yield a residue of α-bromo-γ-methyl tetronic acid which is recrystallized from ethyl acetate.

In a similar manner, by repeating the above procedure with one exception, namely substituting γ-ethyl tetronic acid and γ-propyl tetronic acid for γ-methyl tetronic acid, there are obtained α-bromo-γ-ethyl tetronic acid and α-bromo-γ-propyl tetronic acid, respectively.

PREPARATION B

To a solution of 1 g. of γ-methyl tetronic acid in 10 ml. of anhydrous chloroform is added a solution of 1.05 molar equivalents of chlorine in 10 ml. of anhydrous chloroform. The resulting mixture is allowed to stand at room temperature for a period of one-half hour and then washed with 5% aqueous sodium bicarbonate. The organic phase is separated, dried and evaporated under reduced pressure to yield a residue of α-chloro-γ-methyl tetronic acid which is recrystallized from ethyl acetate.

Similarly, using the above process the α-chloro-γ-ethyl and -propyl tetronic acids can be prepared.

PREPARATION C

To a solution of 19.8 g. of methyl cyanoacetate in 100 ml. of anhydrous benzene is added a freshly prepared solution of 4.6 g. of sodium in 50 ml. of methanol. After cooling the above mixture to 0° C., there is then added dropwise 21.7 g. of propionyl chloride over a period of 30 minutes, and the resulting solution is held at 20° C.

for 24 hours. The reaction mixture is then washed with water, dried and evaporated under reduced pressure to afford a distillable oil containing methyl 2-cyano-3-oxovalerate.

To a well-stirred solution of the above oil in 100 ml. of anhydrous ether is added dropwise 32 g. of bromine at such a rate that the solution continuously remains substantially clear. After the addition of the bromine, stirring is maintained for two hours. The resulting oil is then dissolved in 65 ml. of xylene, the ether solvent removed by distillation, and the resulting xylene mixture is refluxed for 17 hours. The xylene mixture is distilled in vacuo to a small volume which upon cooling deposits a precipitate of α-cyano-γ-methyl tetronic acid which is recrystallized from ethyl acetate.

In a similar manner, by repeating the above procedure with one exception, namely substituting a molar amount of acetyl chloride, n-butyryl chloride, n-valeryl chloride and iso-valeryl chloride for propionyl chloride, there are obtained α-cyano tetronic acid, α-cyano-γ-ethyl tetronic acid, α-cyano-γ-n-propyl tetronic acid, and α-cyano-γ-iso-propyl tetronic acid, respectively.

PREPARATION D

To a solution of 35.6 g. of diethyl fluoromalonate in 100 ml. of anhydrous benzene is added a freshly prepared solution of 4.6 g. of sodium in 50 ml. of methanol. After cooling the above mixture to 0° C., there is then added dropwise 25.8 g. of chloroacetyl chloride over a period of one hour, and the resulting mixture is heated under reflux for one-half hour, cooled, washed with water, dried and evaporated under reduced pressure to afford a distillable oil containing diethyl α-fluoro-α-chloroactylmalonate.

To the latter oil is added 60 ml. of xylene, and the resulting mixture is head under reflux for a period of two hours. After cooling the reaction mixture, there is then added 120 ml. of petroleum ether to yield α-fluoro tetronic acid which is recrystallized from ethyl acetate.

In a similar manner, by repeating the above procedure with one exception, namely substituting a molar amount of α-chloropropionyl chloride, α-chloro-n-butyryl chloride, α-chloro-n-valeryl chloride, and α-chloro-iso-valeryl chloride, there are obtained α-fluoro-γ-methyl tetronic acid, α-fluoro-γ-ethyl tetronic acid, α-fluoro-γ-n-propyl tetronic acid, and α-fluoro-γ-iso-propyl tetronic acid, respectively.

PREPARATION E

To a refluxing solution of 5.7 g. of tetronic acid in 500 ml. of ethanol are added over a 30 minute period a solution of 80 g. of potassium hydroxide in 50 ml. of water and 25 ml. of dimethyl sulfate. Fifteen ml. and 5 ml. portions of the KOH solution and dimethyl sulfate, respectively, being added alternatively. The reaction mixture is then held at reflux for 45 minutes, cooled and then poured into ice water. Upon neutralization with hydrochloric acid, there is formed a precipitate of the O-methyl enol ether of tetronic acid.

A solution of 3.99 g. of the thus-obtained O-methyl enol ether of tetronic acid and 0.8 g. of benzoyl peroxide in 15 ml. of benzene is added over a period of one and one-half hours, to a refluxing solution of 10 g. of trichloromethanesulfonyl chloride in 15 ml. of benzene. The resulting reaction mixture is held at reflux for 15 hours. After removing the solvent by evaporation under reduced pressure, there is obtained α-trichloromethyl tetronic acid which is recrystallized from ethyl acetate:hexane.

In a similar manner, by repeating the above procedure with one exception, namely substituting a molar amount of γ-methyl tetronic acid, γ-ethyl tetronic acid, γ-n-propyl tetronic acid, and γ-iso-propyl tetronic acid for tetronic acid, there is obtained α-trichloromethyl-γ-methyl tetronic acid, α-trichloromethyl-γ-ethyl tetronic acid, α-trichloromethyl-γ-n-propyl tetronic acid, and α-trichloromethyl-γ-iso-propyl tetronic acid, respectively.

PREPARATION F

To a refluxing solution of 5.7 g. of tetronic acid and 500 ml. of ethanol are added over a 30 minute period a solution of 80 g. of potassium hydroxide in 50 ml. of water and 25 ml. of dimethyl sulfate. Fifteen ml. and 5 ml. portions of the KOH solution and dimethyl sulfate, respectively, being added alternatively.

The reaction mixture is then held at reflux for 45 minutes, cooled and then poured into ice water. Upon neutralization with hydrochloric acid there is formed a precipitate of the O-methyl enol ether of tetronic acid.

A mixture of 1 g. of O-methyl enol ether of tetronic acid and 12 g. of trifluoroiodomethane is irradiated with ultraviolet light from a high presusre mercury lamp at room temperature for 100 hours in a sealed quartz tube. After removing the excess trifluoroiodomethane by evaporation under reduced pressure, there is obtained α-trifluoromethyl tetronic acid which is recrystallized from ethyl acetate:hexane.

In a similar manner, by repeating the above procedure with one exception, namely substituting a molar amount of γ-methyl tetronic acid, γ-ethyl tetronic acid, γ-n-propyl tetronic acid, and γ-iso-propyl tetronic acid for tetronic acid, there is obtained α-trifluoromethyl-γ-methyl trifluoromethyl-γ-n-propyl tetronic acid, and α-trifluoromethyl-γ-iso-propyl tetronic acid, respectively.

Example 1

To a solution of 16.10 g. (0.05 mole) of 2-(6-methoxy-1,2,3,4-tetrahydronaphthyliden)ethyl isothiouronium acetate in a mixture of 80 ml. of ethanol and 100 ml. of water, is added a solution of 5.7 g. (0.05 mole) of γ-methyl tetronic acid in 20 ml. of ethanol. Immediately, the reaction mixture is diluted by adding an additional 80 ml. of water, stirred, and allowed to stand at room temperature for 16 hours. The reaction mixture is then cooled to 5° C. for two hours and the thus-formed precipitate is collected by filtration to yield α-[2-(6-methoxy-1,2,3,4 - tetrahydronaphthyliden)ethyl]-γ-methyl tetronic acid.

By repeating the process of this example with the exception of substituting an equivalent amount of α-fluoro-γ-methyl tetronic acid, α-bromo-γ-methyl tetronic acid, α-chloro-γ-methyl tetronic acid, α-hydroxy-γ-methyl tetronic acid, α-methoxy-γ-methyl tetronic acid, α-acetyl-γ-methyl tetronic acid, α-trifluoromethyl-γ-methyl tetronic acid, α-trichloromethyl-γ-methyl tetronic acid α-methoxycarbonyl-γ-methyl tetronic acid, tetronic acid, and α-cyano-γ-methyl tetronic acid in place of γ-methyl tetronic acid, there is obtained:

α-[2-(6-methoxy-1,2,3,4-tetrahydronaphthyliden)
  ethyl]-α-fluoro-γ-methyl tetronic acid,
α-[2-(6-methoxy-1,2,3,4-tetrahydronaphthyliden)
  ethyl]-α-bromo-γ-methyl tetronic acid,
α-[2-(6-methoxy-1,2,3,4-tetrahydronaphthyliden)
  ethyl]-α-chloro-γ-methyl tetronic acid,
α-[2-(6-methoxy-1,2,3,4-tetrahydronaphthyliden)
  ethyl]-α-hydroxy-γ-methyl tetronic acid,
α-[2-(6-methoxy-12,3,4-tetrahydronaphthyliden)
  ethyl]-α-methoxy-γ-methyl tetronic acid,
α-[2-(6-methoxy-1,2,3,4-tetrahydronaphthyliden)
  ethyl-]α-acetyl-γ-methyl tetronic acid,
α-[2-(6-methoxy-1,2,3,4-tetrahydronaphthyliden)
  ethyl]-α-trifluoromethyl-γ-methyl tetronic acid,
α-[2-(6-methoxy-1,2,3,4-tetrahydronaphthyliden)
  ethyl]-α-trichloromethyl-γ-methyl tetronic acid,
α-[2-(6-methoxy-1,2,3,4-tetrahydronaphthyliden)
  ethyl]-α-methoxycarbonyl-γ-methyl tetronic acid,
α-[2-(6-methoxy-1,2,3,4-tetrahydronaphthyliden)
  ethyl]-tetronic acid, and
α-[2-(6-methoxy-1,2,3,4-tetrahydronaphthyliden)
  ethyl]-α-cyano-γ-methyl tetronic acid, respectively.

By repeating the process of this example with the exception of substituting an equivalent amount of other isothiouronium acetates of Formula I above, for example, 2 - (6-methoxy-3-methyl-1,2,3,4-tetrahydronaphthyliden) ethyl isothiouronium acetate, 2-(6,8-dihydroxy-1,2,3,4-tetrahydronaphthyliden)ethyl isothiouronium acetate, 2-(6-methoxy-8-methyl - 1,2,3,4 - tetrahydronaphthyliden) ethyl isothiouronium acetate, 2-(6,8-dihydroxy-3-methyl-1,2,3,4-tetrahydronaphthyliden)ethyl isothiouronium acetate, 2 - (6-hydroxy-1,2,3,4-tetrahydronaphthyliden)ethyl isothiouronium acetate, 2-(6-hydroxy - 3 - methyl-1,2,3,4-tetrahydronaphthyliden)ethyl acetate, 2 - (6 - hydroxy-8-methyl - 1,2,3,4-tetrahydronaphthyliden)ethyl isothiouronium acetate and 2-(6,8-dimethoxy-1,2,3,4-tetrahydronaphthyliden) ethyl isothiouronium acetate in place of 2-(6 - methoxy-1,2,3,4-tetrahydronaphthyliden)ethyl isothiouronium acetate, there is obtained:

α-[2-(6-methoxy-3-methyl-1,2,3,4-tetrahydronaphthyliden)ethyl]-γ-methyl tetronic acid,
α-[2-(6,8-dihydroxy-1,2,3,4-tetrahydronaphthyliden)ethyl]-γ-methyl tetronic acid,
α-[2-(6-methoxy-8-methyl-1,2,3,4-tetrahydronaphthyliden)ethyl]-γ-methyl tetronic acid,
α-[2-(6,8-dihydroxy-3-methyl-1,2,3,4-tetrahydronaphthyliden)ethyl]-γ-methyl tetronic acid,
α-[2-(6-hydroxy-1,2,3,4-tetrahydronaphthyliden)ethyl]-γ-methyl tetronic acid,
α-[2-(6-hydroxy-3-methyl-1,2,3,4-tetrahydronaphthyliden)ethyl]-γ-methyl tetronic acid,
α-[2-(6-hydroxy-8-methyl-1,2,3,4-tetrahydronaphthyliden)ethyl]-γ-methyl tetronic acid,
α-[2-(6,8-dimethoxy-1,2,3,4-tetrahydronaphthyliden)ethyl]-γ-methyl tetronic acid,
α-[2-(6-methoxy-3-methyl-1,2,3,4-tetrahydronaphthyliden)ethyl]-α-fluoro-γ-methyl tetronic acid,
α-[2-(6,8-dihydroxy-1,2,3,4-tetrahydronaphthyliden)ethyl]-α-fluoro-γ-methyl tetronic acid,
and the like, respectively.

Example 2

One gram of α-[2-(6-methoxy-1,2,3,4-tetrahydronaphthyliden)ethyl]-α-bromo-γ-methyl tetronic acid in 50 ml. of acetic acid is stirred at 20° C. with 10 g. of zinc dust for one hour. The zinc is then filtered off and the reaction mixture diluted with 500 ml. of water and the product isolated by extraction with ethyl acetate. The residue is purified by crystallization from ether-hexane to furnish α-[2-(6 - methoxy-1,2,3,4-tetrahydronaphthyliden)ethyl]-γ-methyl tetronic acid.

Similarly, the other α-bromo compounds of Example 1 can be subjected to the above process, for example:

α-[2-(6-methoxy-3-methyl-1,2,3,4-tetrahydronaphthyliden)ethyl]-α-bromo-γ-methyl tetronic acid,
α-[2-(6,8-dihydroxy-1,2,3,4-tetrahydronaphthyliden)ethyl]-α-bromo-γ-methyl tetronic acid,
α-[2-(6-methoxy-8-methyl-1,2,3,4-tetrahydronaphthyliden)ethyl]-α-bromo-γ-methyl tetronic acid,
α-[2-(6,8-dihydroxy-3-methyl-1,2,3,4-tetrahydronaphthyliden)ethyl]-α-bromo-γ-methyl tetronic acid,
α-[2-(6-hydroxy-1,2,3,4-tetrahydronaphthyliden)ethyl]-α-bromo-γ-methyl tetronic acid,
α-[2-(6-hydroxy-3-methyl-1,2,3,4-tetrahydronaphthyliden)ethyl]-α-bromo-γ-methyl tetronic acid,
α-[2-(6-hydroxy-8-methyl-1,2,3,4-tetrahydronaphthyliden)ethyl]-α-bromo-γ-methyl tetronic acid and
α-[2-(6,8-dimethoxy-1,2,3,4-tetrahydronaphthyliden)ethyl]-α-bromo-γ-methyl tetronic acid, to furnish the corresponding α-unsubstituted-γ-methyl tetronic acids.

Example 3

To a solution of 15 g. of α-[2-(6-methoxy-1,2,3,4-tetrahydronaphthyliden)ethyl]-γ-methyl tetronic acid in 200 ml. of water-dioxane (1:1), under nitrogen, there is added 200 mg. of sodium hydroxide followed by a solution of 4 g. of sodium methoxide dissolved in 16 ml. of methanol. Then 12 ml. of 40% aqueous formaldehyde is added to this solution and the mixture stirred for 12 hours. After cooling, the reaction mixture is then extracted with methylene chloride (2× 100 ml.). The organic phase is dried and evaporated to dryness to yield α-[2 - (6-methoxy-1,2,3,4-tetrahydronaphthyliden)ethyl]-α-hydroxymethyl-γ-methyl tetronic acid.

By repeating the above process using other α-unsubstituted tetronic acids, see Example 2, for example, the corresponding α-hydroxymethyl tetronic acids are obtained, for example:

α-[2-(6-methoxy-3-methyl-1,2,3,4-tetrahydronaphthyliden)ethyl]-α-hydroxymethyl-γ-methyl tetronic acid,
α-[2-(6,8-dihydroxy-1,2,3,4-tetrahydroanaphthyliden)ethyl]-α-hydroxymethyl-γ-methyl tetronic acid,
α-[2-(6-methoxy-8-methyl-1,2,3,4-tetrahydronaphthyliden)-ethyl]-α-hydroxymethyl-γ-methyl tetronic acid,
α-[2-(6,8-dihydroxy-3-methyl-1,2,3,4-tetrahydronaphthyliden)ethyl]-α-hydroxymethyl-γ-methyl tetronic acid,
α-[2-(6-hydroxy-1,2,3,4-tetrahydronaphthyliden)ethyl]-α-hydroxymethyl-γ-methyl tetronic acid,
α-[2-(6-hydroxy-3-methyl-1,2,3,4-tetrahydronaphthyliden)ethyl]-α-hydroxymethyl-γ-methyl tetronic acid,
α-[2-(6-hydroxy-8-methyl-1,2,3,4-tetrahydronaphthyliden)ethyl]-α-hydroxymethyl-γ-methyl tetronic acid and
α-[2-(6,8-dimethoxy-1,2,3,4-tetrahydronaphthyliden)ethyl]-α-hydroxymethyl-γ-methyl tetronic acid.

Example 4

To a solution of 1 g. of α-[2-(6-methoxy-1,2,3,4-tetrahydronaphthyliden)ethyl]-α-hydroxymethyl - γ - methyl tetronic acid in 30 ml. of anhydrous methylene chloride, is added 1 g. of N-(2-chloro-1,1,2-trifluoroethyl)diethylamine, and the resulting reaction mixture is held at reflux for a period of five hours. After cooling, the reaction mixture is poured into water and extracted with several portions of ether. The organic phase is separated, dried and evaporated to dryness to yield α-[2-(6-methoxy-1,2,3,4-tetrahydronaphthyliden)ethyl] - α - fluoromethyl-γ-methyl tetronic acid which is recrystallized from ethyl acetate.

By repeating the above process with the exception of using an equivalent amount of other α-hydroxymethyl tetronic acids, see Example 3, in place of α-[2-(6-methoxy-1,2,3,4-tetrahydronaphthyliden)ethyl] - α - hydroxymethyl-γ-methyl tetronic acid, the corresponding α-fluoromethyl compounds are obtained, that is:

α-[2-(6-methoxy-3-methyl-1,2,3,4-tetrahydronaphthyliden)ethyl]-α-fluoromethyl-γ-methyl tetronic acid,
α-[2-(6,8-dihydroxy-1,2,3,4-tetrahydronaphthyliden)ethyl]-α-fluoromethyl-γ-methyl tetronic acid,
α-[2-(6-methoxy-8-methyl-1,2,3,4-tetrahydronaphthyliden)ethyl]-α-fluoromethyl-γ-methyl tetronic acid,
α-[2-(6,8-dihydroxy-3-methyl-1,2,3,4-tetrahydronaphthyliden)ethyl]-α-fluoromethyl-γ-methyl tetronic acid, and
the like, respectively.

Example 5

To a solution of 1 g. of α-[2-(6-methoxy-1,2,3,4-tetrahydronaphthyliden)ethyl]-α-hydroxymethyl tetronic acid in 50 ml. of anhydrous ether, previously cooled to 0° C., is added 1.5 ml. of thionyl chloride. The reaction mixture is held at 0° C. for 15 minutes, warmed to room temperature and washed with an aqueous solution of sodium bicarbonate. The organic phase is separated, dried and evaporated to dryness to yield α-[2-(6-methoxy-1,2,3,4-tetrahydronaphthyliden)ethyl] - α - chloromethyl - γ-methyltetronic acid.

By repeating the above procedure using the other α-hydroxymethyl compounds of Example 3 as the starting material, the corresponding α-chloromethyl compounds are obtained, for example:

α-[2-(6-methoxy-3-methyl-1,2,3,4-tetrahydronaphthyl-iden)-ethyl]-α-chloromethyl-γ-methyl tetronic acid,
α-[2-(6-methoxy-8-methyl-1,2,3,4-tetrahydronaphthyl-iden)ethyl]-α-chloromethyl-γ-methyl tetronic acid,
α-[2-(6,8-dihydroxy-1,2,3,4-tetrahydronaphthyliden)ethyl]-α-chloromethyl-γ-methyl tetronic acid,
α-[2-(6,8-dihydroxy-3-methyl-1,2,3,4-tetrahydronaphthyliden)ethyl]-α-chloromethyl-γ-methyl tetronic acid, and the like.

Example 6

To a solution of 1 g. of α-[2-(6-methoxy-1,2,3,4-tetrahydronaphthyliden)ethyl]-α-hydroxymethyl - γ - methyl tetronic acid in 50 ml. of benzene is added 2 ml. of phosphorus tribromide. The reaction mixture is held at reflux for one-half hour and cooled. The reaction mixture is poured into water and extracted several times with ether, dried and evaporated under reduced pressure to yield α-[2-(6-methoxy - 1,2,3,4 - tetrahydronaphthyliden)ethyl]-α-bromomethyl-γ-methyl tetronic acid.

By repeating the above procedure with the other α-hydroxymethyl compounds of Example 3, there is obtained the corresponding α-bromomethyl compounds.

Example 7

A mixture of 5 g. of α-[2-(6-methoxy-1,2,3,4-tetrahydronaphthyliden)ethyl] - α - hydroxymethyl - γ - methyl tetronic acid in 140 ml. of 98% formic acid is held at room temperature for three hours and then poured onto an excess of ice. After filtration and washing with water, there is obtained 3-methoxy-13-hydroxymethyl-15-methyl-16-oxagona-1,3,5(10),8,14-pentaen-17-one which is recrystallized from ethanol.

By repeating the process of this example with the exception of using an equivalent amount of other α-hydroxymethyl tricyclic compounds (see Example 3) as the starting material, the corresponding tetracyclic enol lactones are obtained, that is:

3-methoxy-13-hydroxymethyl-7,15-dimethyl-16-oxagona-1,3,5(10),8,14-pentaen-17-one,
1,3-dihydroxy-13-hydroxymethyl-15-methyl-16-oxagino-1,3,5(10),8,14-pentaen-17-one,
3-methoxy-1,15-dimethyl-13-hydroxymethyl-16-oxagona-1,3,5(10),8,14-pentaen-17-one,
1,3-dihydroxy-7,15-dimethyl-13-hydroxymethyl-16-oxagona-1,3,5(10),8,14-pentanen-17-one,
3-hydroxy-13-hydroxymethyl-15-methyl-16-oxagona-1,3,5(10),8,14-pentaen-17-one,
3-hydroxy-7,15-dimethyl-13-hydroxymethyl-16-oxagona-1,3,5(10),8,14-pentaen-17-one,
3-hydroxy-1,15-dimethyl-13-hydroxymethyl-16-oxagona-1,3,5(10),8,14-pentaen-17-one, and
1,3-dimethyl-13-hydroxymethyl-16-oxagona-1,3,5(10),8,14-pentaen-17-one, respectively.

Example 8

To a substantially anhydrous solution of 1 g. of 3-methoxy-13-hydroxymethyl-15-methyl - 16 - oxagona-1,3,5(10),8,14-pentaen-17-one and 1.85 g. of N,N'-dicyclohexylcarbodiimide in 15 ml. of dimethyl sulfoxide there is added 0.15 g. of anhydrous orthophosphoric acid. The resulting reaction mixture is held at room temperature for two hours, then 0.62 g. of N,N'-dicyclohexyl-carbodiimide is added. The reaction mixture is then allowed to stand for an additional hour. After removing the solvent by evaporation under reduced pressure, there is obtained 3-methoxy-13-formyl-15-methyl - 16 - oxagona-1,3,5(10),8,14-pentaen-17-one which is recrystallized from ethyl acetate.

By repeating the above procedure using the other 13-hydroxymethyl - 16 - oxagona-1,3,5(10),8,14-pentaen-17-ones of Example 7 as the starting material, there are obtained the corresponding 13-formyl-16-oxagona-1,3,5(10),8,14-pentaen-17-ones.

As an alternative to the foregoing procedure, a 13-hydroxymethyl-16-oxagona-1,3,5(10),8,14-pentaen - 17 - one can be converted into the corresponding 13-formyl compound by treatment with chromic oxide in pyridine, for example:

A solution of 1 g. of 3-methoxy-13-hydroxymethyl-15-methyl-16-oxagona-1,3,5(10),8,14-pentaen-17-one is 25 ml. of pyridine, previously cooled to 0° C., is added to a cooled solution (0° C.) of 1 g. of chromic oxide in 25 ml. of pyridine. The resulting reaction mixture is held at 0° C. for a period of 24 hours, diluted with ethyl acetate and filtered through diatomaceous earth. The filtrate is washed with water, dried and evaporated to dryness to yield 3-methoxy-13-formyl-15-methyl-16 - oxagona - 1,3,5(10),8,14-pentaen-17-one which is recrystallized from acetone: hexane.

Example 9

A solution of 0.66 g. of 3-methoxy-13-formyl-15-methyl-16-oxagona-1,3,5(10),8,14-pentaen-17-one in 25 ml. of dioxane in a stainless steel shaker tube is treated at —70° C. with two molar equivalents of sulfur tetrafluoride. The shaker tube is sealed, allowed to warm to room temperature and then held at room temperature for a period of 20 hours. The shaker tube is then cooled and the contents of the tube poured carefully into ice water and treated with an excess of sodium bicarbonate. The aqueous phase is extracted with several portions of methylene chloride. The organic phase is separated, dried and evaporated to dryness under reduced pressure to yield 3 - methoxy - 13 - difluoro-methyl-15-methyl-16-oxagona-1,3,5(10),8,14-pentaen - 17 - one which is recrystallized from ethanol.

In a similar manner, by repeating the above procedure using other 13-formyl compounds of Example 8 as the starting material the corresponding 13-difluoromethyl compounds are obtained, that is:

3-methoxy-13-difluoromethyl-7,15-dimethyl-16-oxagona-1,3,5(10),8,14-pentaen-17-one,
1,3-dihydroxy-13-difluoromethyl-15-methyl-16-oxagona-1,3,5(10),8,14-pentaen-17-one,
3-methoxy-1,15-dimethyl-13-difluoromethyl-16-oxagona-1,3,5(10),8,14-pentaen-17-one,
1,3-dihydroxy-7,15-dimethyl-13-difluoro-methyl-16-oxagona-1,3,5(10),8,14-pentaen-17-one,
3-hydroxy-13-difluoromethyl-15-methyl-16-oxagona-1,3,5(10),8,14-pentaen-17-one,
3-hydroxy-7,15,dimethyl-13-difluoromethyl-16-oxagona-1,3,5(10),8,14-pentaen-17-one,
3-hydroxy-1,15-dimethyl-13-difluoromethyl-16-oxagona-1,3,5(10),8,14-pentaen-17-one, and
1,3-dimethoxy-13-difluoromethyl-16-oxagona-1,3,5(10),8,14-pentaen-17-one, respectively.

Example 10

A mixture of 2 g. of 3-methoxy-13-formyl-15-methyl-16-oxagona-1,3,5(10),8,14-pentaen-17-one and 3 g. of phosphorus pentachloride, 100 ml. of carbon tetrachloride is held at reflux for a period of two hours. The reaction mixture is cooled, washed with several portions of 5% aqueous sodium bicarbonate solution, and then with several portions of water. The organic phase is separated, dried and evaporated to dryness under reduced pressure to yield 3-methoxy-13-dichloromethyl-15-methyl-16-oxagona 1,3,5(10),8,14-pentaen-17-one which is recrystallized from ethanol.

By subjecting the other 13-formyl compounds of Example 8 to the above process, the corresponding 13-dichloromethyl compounds are obtained, for example:

3-methoxy-7,15-dimethyl-13-dichloromethyl-16-oxagona-1,3,5(10),8,14-pentaen-17-one, 3-methoxy-1,15-dimethyl-13-dichloromethyl-16-oxagona-1,3,5(10),8,14-pentaen-17-one,
1,3-dihydroxy-13-dichloromethyl-15-methyl-16-oxagona-1,3,5(10),8,14-pentaen-17-one and
1,3-dihydroxy-7,15-dimethyl-13-dichloromethyl-16-oxagona-1,3,5(10),8,14-pentaen-17-one.

Example 11

A mixture of 9 g. of α-[2-(6-methoxy-1,2,3,4-tetrahydronaphthyliden)ethyl]-γ-methyl tetronic acid and 400 mg. of p-toluenesulfonic acid in 120 ml. of benzene is heated at reflux for four hours, during which time water is continuously removed from the reaction mixture by a Dean-Stark trap. After cooling, the reaction mixture is filtered through a short column of silica gel and evaporated under reduced pressure to yield 3-methoxy-15-methyl-16-oxagona-1,3,5(10),8,14-pentaen-17-one which is recrystallized from ether.

By subjecting the other 1,2,3,4-tetrahydronaphthyliden tetronic acids of Examples 1 through 6 to the above process, the corresponding 16-oxagona-1,3,5(10),8,14-pentaen-17-one is obtained, for example:

3-methoxy-13-fluoro-15-methyl-16-oxagona-1,3,5(10),8,14-pentaen-17-one,
3-methoxy-13-chloro-15-methyl-16-oxagona-1,3,5(10),8,14-pentaen-17-one,
3-methoxy-15-methyl-16-trifluoromethyl-16-oxagona-1,3,5(10),8,14-pentaen-17-one,
3-methoxy-15-methyl-13-trichloromethyl-16-oxagona-1,3,5(10),8,14-pentaen-17-one,
3-methoxy-13-chloromethyl-15-methyl-16-oxagona-1,3,5(10),8,14-pentaen-17-one,
3-methoxy-7,15-dimethyl-13,trifluoromethyl-16-oxagona-1,3,5(10),8,14-pentaen-17-one,
3-methoxy-7,15-dimethyl-13-chloromethyl-16-oxagona-1,3,5(10),8,14-pentaen-17-one,
1,3-dihydroxy-15-methyl-13-chloromethyl-16-oxagona-1,3,5(10),8,14-pentaen-17-one,
1,3-dihydroxy-15-methyl-13-trifluoromethyl-16-oxagona-1,3,5(10),8,14-pentaen-17-one,
3,13-dimethoxy-15-methyl-16-oxagona-1,3,5(10),8,14-pentaen-17-one,
3-methoxy-13-hydroxy-15-methyl-16-oxagona-1,3,5(10),8,14-pentaen-17-one and
1,3-dimethoxy-13-fluoromethyl-15-methyl-16-oxagona-1,3,5(10),8,14-pentaen-17-one are obtained using as the starting material:

[α2-(6-methoxy-1,2,3,4-tetrahydronaphthyliden)ethyl]-α-fluoro-γ-methyl tetronic acid,
α-[2-(6-methoxy-1,2,3,4-tetrahydronaphthyliden)ethyl]-α-chloro-γ-methyl tetronic acid,
α-[2-(6-methoxy-1,2,3,4-tetrahydronaphthyliden)ethyl]-α-trifluoromethyl-γ-methyl tetronic acid,
α-[2-(6-methoxy-1,2,3,4-tetrahydronaphthyliden)ethyl]-α-trichloromethyl-γ-methyl tetronic acid,
α-[2-(6-methoxy-1,2,3,4-tetrahydronaphthyliden)ethyl]-α-chloromethyl-γ-methyl tetronic acid,
α-[2-(6-methoxy-3-methyl-1,2,3,4-tetrahydronaphthyliden)ethyl]-α-trifluoromethyl-γ-methyl tetronic acid,
α-[2-(6-methoxy-3-methyl-1,2,3,4-tetrahydronaphthyliden)-ethyl]-α-chloromethyl-γ-methyl tetronic acid,
α-[2-dihydroxy-1,2,3,4-tetrahydronaphthyliden)ethyl]-α-chloromethyl-γ-methyl tetronic acid,
α-[2-(6-dihydroxy-1,2,3,4-tetrahydronaphthyliden)ethyl]-trifluoromethyl-γ-methyl tetronic acid,
α-[2-(6-methoxy-1,2,3,4-tetrahydronaphthyliden)ethyl]-α-methoxy-γ-methyl tetronic acid,
α-[2-(6-methoxy-1,2,3,4-tetrahydronaphthyliden)-ethyl]-α-hydroxy-γ-methyl tetronic acid, and
α-[2-6,8-dimethoxy-1,2,3,4-tetrahydronaphthyliden)ethyl]-α-fluoromethyl-γ-methyl tetronic acid, respectively.

Example 12

A mixture of 0.5 g. of 3-methoxy-13-hydroxymethyl-15-methyl-16-oxagona-1,3,5(10),8,14-pentaen - 17 - one and 0.25 g. of 5% palladium-on-charcoal catalyst and 75 ml. of xylene is heated at reflux for 36 hours. The mixture is then cooled, filtered to remove the catalyst and the filtrate is evaporated under reduced pressure to yield a residue containing 3 - methoxy-13-hydroxymethyl-15-methyl-16-oxagona-1,3,5(10),6,8,14 - hexaen - 17 - one and 3-methoxy-13-hydroxymethyl - 15ξ - methyl-16-oxa-14β - gona-1,3,5(10),6,8-pentaen-17-one. The residue is purified by preparative thin layer chromatography and crystallized from methanol to yield 3 - methoxy-13-hydroxymethyl-15-methyl - 16 - oxagona-1,3,5(10),6,8,14-hexaen-17-one.

By repeating the procedure of this example using other tetracyclic enol lactones of Examples 7 through 11 in place of 3-methoxy-13-hydroxymethyl-15-methyl-16-oxagona-1,3,5(10),8,14 - pentaen-17-one as the strating material, the corresponding 6,7-dehydro compounds are obtained, e.g.:

3-methoxy-13-fluoro-15-methyl-16-oxagona-1,3,5(10),6,8,14-hexaen-17-one,
3-methoxy-13-difluoromethyl-7,15-dimethyl-16-oxagona-1,3,5(10),6,8,14-hexaen-17-one,
3-methoxy-13-trifluoromethyl-7,15-dimethyl-16-oxagona-1,3,5(10),6,8,14-hexaen-17-one,
3-methoxy-13-trifluoromethyl-15-methyl-16-oxagona-1,3,5(10),6,8,14-hexaen-17-one,
1,3-dihydroxy-13-difluoromethyl-15-methyl-16-oxagona-1,3,5(10),6,8,14-hexaen-17-one,
1,3-dihydroxy-13-trifluoromethyl-15-methyl-16-oxagona-1,3,5(10),6,8,14-hexaen-17-one,
1,3-dihydroxy-13-difluoromethyl-7,15-dimethyl-16-oxagona-1,3,5(10),6,8,14-hexaen-17-one, and
1,3-dimethoxy-13-formyl-15-methyl-16-oxagona-1,3,5(10),6,8,14-hexaen-17-one.

By repeating the above example with the exception that 5 mg. of 5% palladium-on-charcoal catalyst is used in place of 0.25 grams thereof, there is obtained a residue containing predominantly 3-methoxy-13-hydroxymethyl-15-methyl-16-oxagona-1,3,5(10),6,8,14-hexaen - 17 - one and a small amount of 3-methoxy-13-hydroxymethyl-15ξ-methyl-16-oxa-14β-gona-1,3,5(10),6,8,-pentaen - 17 - one which can be separated by preparative thin layer chromatography.

By repeating the process of this example with the exception of adding 0.4 g. of maleic acid to the reaction mixture prior to dehydrogenation, there is obtained solely the 6,7-dehydro derivatives which can be recrystallized from methanol.

Example 13

A mixture of 0.2 g. of 3-methoxy-13-chloromethyl-15-methyl-16-oxagona-1,3,5(10),8,14-pentaen - 17 - one, 15 ml. of t-butanol, 0.1 g. of freshly sublimed selenium dioxide and 2 drops of pyridine is held at reflux under nitrogen for a period of three hours. The reaction mixture is cooled and then filtered through diatomaceous earth. The filtrate is evaporated to dryness under reduced pressure and the thus-obtained residue is dissolved in acetone. The acetone solution is refluxed in the presence of charcoal for one hour, filtered through diatomaceous earth and evaporated to dryness to yield 3-methoxy-13-chloromethyl-15-methyl - 16 - oxagona-1,3,5(10),6,8,14-hexaen-17-one which is recrystallized from methanol.

By repeating the procedure of this example with the exception of using an equivalent amount of other 16-oxagona-1,3,5(10),8,14 - pentaen-17-ones as the starting material, see Examples 10 and 11, the corresponding 6,7-dehydro compounds are obtained, e.g.:

3-methoxy-13-dichloromethyl-15-methyl-16-oxagona-1,3,5(10),6,8,14-hexaen-17-one, 3-methoxy-13-chloromethyl-7,15-dimethyl-16-oxa-
  gona-1,3,5(10),6,8,14-hexaen-17-one,
3-methoxy-13-chloromethyl-1,15-dimethyl-16-oxa-
  gona-1,3,5(10),6,8,14-hexaen-17-one,
1,3-dihydroxy-13-chloromethyl-15-methyl-16-oxa-
  gona-1,3,5(10),6,8,14-hexaen-17-one,
3-methoxy-13-chloro-15-methyl-16-oxagona-
  1,3,5(10),6,8,14-hexaen-17-one and
3-methoxy-13-bromo-15-methyl-16-oxagona-
  1,3,5(10),6,8,14-hexaen-17-one.

Example 14

A mixture of 250 mg. of 3-methoxy-13-hydroxymethyl-15-methyl - 16 - oxagona-1,3,5(10),6,8,14-hexaen-17-one in 30 ml. of ethanol and 10 ml. of 1 N aqueous sodium hydroxide solution is held at room temperature for two hours. The reaction mixture is then extracted several times with ether. The ether extracts are combined, dried and evaporated to give the sodium salt of cis 7-methoxy-1-acetyl-2-hydroxymethyl - 1,2,3,4 - tetrahydrophenanthrene-2-carboxylic acid.

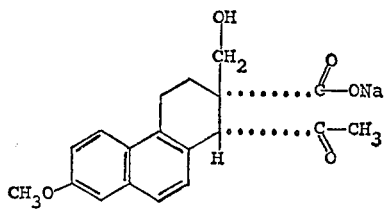

The process of this example is repeated with the exception that an equivalent amount of the other 16-oxagona-1,3,5(10),6,8,14-hexaen-17-one compounds of Examples 12 and 13 are used as the starting material and the corresponding cis sodium salt is obtained, e.g. the sodium salt of:

cis 7-methoxy-1-acetyl-2-fluoro-1,2,3,4-tetrahydro-
  phenanthrene-2-carboxylic acid,
cis 7-methoxy-10-methyl-1-acetyl-2-difluoromethyl-
  1,2,3,4-tetrahydrophenanthrene-2-carboxylic acid,
cis 7-methoxy-10-methyl-1-acetyl-2-trifluoromethyl-
  1,2,3,4-tetrahydrophenanthrene-2-carboxylic acid,
cis 7-methoxy-1-acetyl-2-trifluoromethyl-1,2,3,4-
  tetrahydrophenanthrene-2-carboxylic acid,
cis 5,7-dihydroxy-1-acetyl-2-difluoromethyl-1,2,3,4-
  tetrahydrophenanthrene-2-carboxylic acid,
cis 5,7-dihydroxy-1-acetyl-2-trifluoromethyl-1,2,3,4-
  tetrahydrophenanthrene-2-carboxylic acid,
cis 5,7-dihydroxy-1-acetyl-10-methyl-2-difluoromethyl-
  1,2,3,4-tetrahydrophenanthrene-2-carboxylic acid,
cis 5,7-dimethoxy-1-acetyl-2-formyl-1,2,3,4-tetrahydro-
  phenanthrene-2-carboxylic acid,
cis 7-methoxy-1-acetyl-2-chloromethyl-1,2,3,4-tetra-
  hydrophenanthrene-2-carboxylic acid,
cis 7-methoxy-1-acetyl-2-dichloromethyl-1,2,3,4-tetra-
  hydrophenanthrene-2-carboxylic acid,
cis 7-methoxy-1-acetyl-10-methyl-2-chloromethyl-
  1,2,3,4-tetrahydrophenanthrene-2-carboxylic acid,
cis 7-methoxy-1-acetyl-5-methyl-2-dichloromethyl-
  1,2,3,4-tetrahydrophenanthrene-2-carboxylic acid,
cis 5,7-dihydroxy-1-acetyl-2-chloromethyl-1,2,3,4-tetra-
  hydrophenanthrene-2-carboxylic acid,
cis 7-methoxy-1-acetyl-2-chloro-1,2,3,4-tetrahydro-
  phenanthrene-2-carboxylic acid, and
cis 7-methoxy-1-acetyl-2-bromo-1,2,3,4-tetrahydro-
  phenanthrene-2-carboxylic acid.

Example 15

A mixture of 307 mg. of the sodium salt of cis 7-methoxy-1-acetyl-2-fluoro-1,2,3,4-tetrahydrophenanthrene - 2-carboxylic acid, 1 ml. of methyl iodide and 7 ml. of dimethylacetamide is stirred in the dark for five hours. Then, excess methyl iodide is removed by evaporation under reduced pressure. The reaction mixture is then poured into water and the mixture extracted several times with ether. The ether extracts are combined, washed with water and then dilute aqueous sodium thiosulfate solution, dried and evaporated to furnish the methyl ester of cis 7-methoxy-1-acetyl - 2 - fluoro - 1,2,3,4-tetrahydrophenanthrene-2-carboxylic acid which can be crystallized from benzene-hexane.

Similarly, by repeating the above procedure using other lower alkyl iodides or bromides, e.g. ethyl iodide and the like, in place of methyl iodide, the corresponding lower alkyl esters are obtained, e.g. ethyl ester of cis 7-methoxy-1-acetyl - 2 - fluoro - 1,2,3,4 - tetrahydrophenanthrene-2-carboxylic acid and the like.

By repeating the process of this example using the other 1,2,3,4 - tetrahydrophenanthrenes of Example 14, the corresponding esters are obtained.

Example 16

Into the cathode compartment of a divided electrolysis cell provided with a cellulose dialysis membrane, lead electrodes (each electrode measuring 2 cm. x 5 cm. x 1.6 mm.) and a stirrer, there is added 20 mg. of the methyl ester of cis 7-methoxy-1-acetyl-2-fluoro-1,2,3,4-tetrahydrophenanthrene-2-carboxylic acid and a mixture of 15 ml. of dioxane and 15 ml. of 10% aqueous sulfuric acid (by weight). An additional amount of a mixture of 15 ml. of dioxane and 15 ml. of 10% aqueous sulfuric acid is added to the cell. A current density of 0.02 amp./cm.$^2$ is applied for a period of five hours. The reaction mixture is then removed from the cell and concentrated under reduced pressure to a small volume which is then extracted several times with ether. The ether extracts are combined, washed with water and a 5% aqueous sodium bicarbonate solution, dried and evaporated to dryness to furnish the methyl ester of cis 7-methoxy-1-ethyl-2-fluoro-1,2,3,4-tetrahydrophenanthrene-2-carboxylic acid.

The process of this example is repeated with the exception of substituting an equivalent amount of the other esters of Example 15 as the starting material and the corresponding 1-ethyl derivatives are obtained, e.g., the methyl ester of:

cis 7-methoxy-10-methyl-1-ethyl-2-difluoromethyl-1,2,3,4-
  tetrahydrophenanthrene-2-carboxylic acid,
cis 7-methoxy-10-methyl-1-ethyl-2-trifluoromethyl-1,2,3,4-
  tetrahydrophenanthrene-2-carboxylic acid,
cis 7-methoxy-1-ethyl-2-trifluoromethyl-1,2,3,4-
  tetrahydrophenanthrene-2-carboxylic acid,
cis 5,7-dihydroxy-1-ethyl-2-difluoromethyl-1,2,3,4-
  tetrahydrophenanthrene-2-carboxylic acid,
cis 5,7-dihydroxy-1-ethyl-2-trifluoromethyl-1,2,3,4-
  tetrahydrophenanthrene-2-carboxylic acid,
cis 5,7-dihydroxy-1-ethyl-10-methyl-2-difluoromethyl-
  1,2,3,4-tetrahydrophenanthrene-2-carboxylic acid,
cis 7-methoxy-1-ethyl-2-chloromethyl-1,2,3,4-
  tetrahydrophenanthrene-2-carboxylic acid,
cis 7-methoxy-1-ethyl-2-dichloromethyl-1,2,3,4-
  tetrahydrophenanthrene-2-carboxylic acid,
cis 7-methoxy-1-ethyl-10-methyl-2-chloromethyl-1,2,3,4-
  tetrahydrophenanthrene-2-carboxylic acid,
cis 7-methoxy-1-ethyl-5-methyl-2-dichloromethyl-1,2,3,4-
  tetrahydrophenanthrene-2-carboxylic acid,
cis 5,7-dihydroxy-1-ethyl-2-chloromethyl-1,2,3,4-
  tetrahydrophenanthrene-2-carboxylic acid, and
cis 7-methoxy-1-ethyl-2-chloro-1,2,3,4-tetrahydro-
  phenanthrene-2-carboxylic acid.

Example 17

A mixture of 330 mg. of the methyl ester of cis 7-methoxy - 1 - ethyl - 2 - fluoro-1,2,3,4-tetrahydrophenthrene-2-carboxylic acid, 3.5 g. of potassium hydroxide, 7 ml. of ethanol and 7 ml. of water in a sealed tube is heated at about 180° C. for 45 minutes. The reaction mixture is allowed to cool and is then poured into water. The resulting mixture is then acidified by the addition of dilute aqueous hydrochloric acid and extracted several times with the ethyl acetate. The ethyl acetate extracts are combined, dried and evaporated to furnish cis 7-methoxy-1-ethyl-2-fluoro-1,2,3,4-tetrahydrophenanthrene - 2 - carboxylic acid.

The above process is repeated using the other methyl esters of Example 16 as the starting material and the corresponding free acids are obtained, that is:

cis 7-methoxy-10-methyl-1-ethyl-2-difluoromethyl-1,2,3,4-tetrahydrophenanthrene-2-carboxylic acid,
cis 7-methoxy-10-methyl-1-ethyl-2-trifluoromethyl-1,2,3,4-tetrahydrophenanthrene-2-carboxylic acid,
cis 7-methoxy-1-ethyl-2-trifluoromethyl-1,2,3,4-tetrahydrophenanthrene-2-carboxylic acid,
cis 5,7-dihydroxy-1-ethyl-2-difluoromethyl-1,2,3,4-tetrahydrophenanthrene-2-carboxylic acid,
cis 5,7-dihydroxy-1-ethyl-2-trifluoromethyl-1,2,3,4-tetrahydrophenanthrene-2-carboxylic acid,
cis 5,7-dihydroxy-1-ethyl-10-methyl-2-difluoromethyl-1,2,3,4-tetrahydrophenanthrene-2-carboxylic acid,
cis 7-methoxy-1-ethyl-2-chloromethyl-1,2,3,4-tetrahydrophenanthrene-2-carboxylic acid,
cis 7-methoxy-1-ethyl-2-dichloromethyl-1,2,3,4-tetrahydrophenanthrene-2-carboxylic acid,
cis 7-methoxy-1-ethyl-10-methyl-2-chloromethyl-1,2,3,4-tetrahydrophenanthrene-2-carboxylic acid,
cis 7-methoxy-1-ethyl-5-methyl-2-dichloromethyl-1,2,3,4-tetrahydrophenanthrene-2-carboxylic acid,
cis 5,7-dihydroxy-1-ethyl-2-chloromethyl-1,2,3,4-tetrahydrophenanthrene-2-carboxylic acid, and
cis 7-methoxy-1-ethyl-2-chloro-1,2,3,4-tetrahydrophenanthrene-2-carboxylic acid.

Example 18

A mixture of 5 g. of the methyl ester of cis 7-methoxy-1 - acetyl - 2 - fluoro-1,2,3,4-tetrahydrophenanthrene-2-carboxylic acid in 100 ml. of glacial acetic acid, 5 ml. of 1,2-ethanedithiol, and 4 ml. of acetic acid, which has been previously saturated with anhydrous hydrogen chloride, is held at room temperature for four hours. The reaction mixture is then poured into water and extracted with several portions of ether. The organic phase is separated, dried and evaporated to dryness under reduced pressure. The residue is recrystallized from ethyl acetate:hexane to afford cis 7-methoxy-1',1'-ethylenedithioxyethyl - 2 - fluoro - 1,2,3,4 - tetrahydrophenanthrene-2-carboxylic acid. A mixture of 150 mg. of Raney nickel and 60 ml. of methanol, previously distilled over Raney nickel, is heated at reflux for 24 hours. The catalyst is removed by filtration, washed with methanol and the filtrate evaporated to dryness under reduced pressure. The residue is dissolved in chloroform. The chloroform solution is washed with dilute hydrochloric acid, aqueous 5% sodium carbonate solution and water, and then dried and evaporated to dryness to yield the methyl ester of cis 7-methoxy - 1 - ethyl - 2 - fluoro-1,2,3,4-tetrahydrophenanthrene-2-carboxylic acid which is purified by recrystallization from acetone:hexane.

By repeating the process of this example with the exception of using other 2-halo-keto esters of Example 15 as the starting material, e.g. the methyl ester of cis 7-methoxy - 1 - acetyl - 2 - chloro - 1,2,3,4 - tetrahydrophenanthrene - 2 - carboxylic acid, cis 7-methoxy-1-acetyl - 2 - bromo - 1,2,3,4 - tetrahydrophenanthrene-2-carboxylic acid or the 2-alkoxy-keto esters (prepared according to the procedure of Examples 14 and 15 from the corresponding 13-alkoxy - 16 - oxagona compound), e.g. the methyl ester of cis 2,7-dimethoxy - 1 - acetyl-1,2,3,4 - tetrahydrophenanthrene - 2 - carboxylic acid, the corresponding 1-ethyl compounds are obtained, i.e. the methyl ester of cis 7-methoxy - 1 - ethyl - 2 - chloro-1,2,3,4 - tetrahydrophenanthrene - 2 - carboxylic acid, cis 7-methoxy - 1 - ethyl - 2 - bromo - 1,2,3,4 - tetrahydrophenanthrene - 2 - carboxylic acid, and cis 2,7-dimethoxy-1-ethyl-1,2,3,4-tetrahydrophenanthrene-2-carboxylic acid, respectively.

By subjecting the above-prepared methyl esters to the process of Example 17, the corresponding free carboxylic acids are obtained, i.e. cis 7-methoxy - 1 - ethyl-2-fluoro-1,2,3,4-tetrahydrophenanthrene - 2 - carboxylic acid, cis 7-methoxy - 1 - ethyl - 2 - chloro - 1,2,3,4 - tetrahydrophenanthrene-2-carboxylic acid, cis 7-methoxy-1-ethyl-2-bromo - 1,2,3,4 - tetrahydrophenanthrene-2-carboxylic acid and cis 2,7-dimethoxy - 1 - ethyl-1,2,3,4-tetrahydrophenanthrene-2-carboxylic acid, respectively.

Example 19

The process of Example 14 is repeated with the exception of using an equivalent amount of the 16-oxagona-1,3,5(10),8,14-pentaenes of the present invention, e.g. those of Example 7 through 11 in place of 3-methoxy-13-hydroxymethyl - 15 - methyl - 16 - oxagona - 1,3, 5(10),6,8,14 - hexaen - 17 - one as the starting material and the corresponding 1,2,3,4,9,10 - hexahydrophenanthrene derivatives are obtained, e.g. the sodium salt of:

cis 7-methoxy-1-acetyl-2-hydroxymethyl-1,2,3,4,9,10-hexahydrophenanthrene-2-carboxylic acid,
cis 7-methoxy-1-acetyl-2-difluoromethyl-1,2,3,4,9,10-hexahydrophenanthrene-2-carboxylic acid,
cis 7-methoxy-1-acetyl-2-chloromethyl-10-methyl-1,2,3,4,9,10-hexahydrophenanthrene-2-carboxylic acid,
cis 7-methoxy-1-acetyl-2-difluoromethyl-10-methyl-1,2,3,4,9,10-hexahydrophenanthrene-2-carboxylic acid,
cis 7-methoxy-1-acetyl-2-trifluoro-10-methyl-1,2,3,4,9,10-hexahydrophenanthrene-2-carboxylic acid,
cis 5,7-dihydroxy-1-acetyl-2-chloromethyl-1,2,3,4,9,10-hexahydrophenanthrene-2-carboxylic acid,
cis 5,7-dihydroxy-1-acetyl-2-difluoromethyl-1,2,3,4,9,10-hexahydrophenanthrene-2-carboxylic acid,
cis 5,7-dihydroxy-1-acetyl-2-trifluoromethyl-1,2,3,4,9,10-hexahydrophenanthrene-2-carboxylic acid, and
cis 5,7-dihydroxy-1-acetyl-2-difluoromethyl-10-methyl-1,2,3,4,9,10-hexahydrophenanthrene-2-carboxylic acid are obtained from:

3-methoxy-13-hydroxymethyl-15-methyl-16-oxagona-1,3,5(10),8,14-pentaen-17-one,
3-methoxy-13-difluoromethyl-15-methyl-16-oxagona-1,3,5(10),8,14-pentaen-17-one,
3-methoxy-13-chloromethyl-7,15-dimethyl-16-oxagona-1,3,5(10),8,14-pentaen-17-one,
3-methoxy-13-difluoromethyl-7,15-dimethyl-16-oxagona-1,3,5(10),8,14-pentaen-17-one,
3-methoxy-13-trifluoromethyl-7,15-dimethyl-16-oxagona-1,3,5(10),8,14-pentaen-17-one,
1,3-dihydroxy-13-chloromethyl-15-methyl-16-oxagona-1,3,5(10),8,14-pentaen-17-one,
1,3-dihydroxy-13-difluoromethyl-15-methyl-16-oxagona-1,3,5(10),8,14-pentaen-17-one,
1,3-dihydroxy-13-trifluoromethyl-15-methyl-16-oxagona-1,3,5(10),8,14-pentaen-17-one, and
1,3-dihydroxy-13-difluoromethyl-7,15-dimethyl-16-oxagona-1,3,5(10),8,14-pentaen-17-one, respectively.

By subjecting the above-prepared 1,2,3,4,9,10-hexahydrophenanthrene compounds to the processes of Examples 15, 16 and 17, consecutively, the corresponding free acids are obtained, that is:

cis 7-methoxy-1-ethyl-2-hydroxymethyl-1,2,3,4,9,10-hexahydrophenanthrene-2-carboxylic acid,
cis 7-methoxy-1-ethyl-2-difluoromethyl-1,2,3,4,9,10-hexahydrophenanthrene-2-carboxylic acid,
cis 7-methoxy-1-ethyl-2-chloromethyl-10-methyl-1,2,3,4,9,10-hexahydrophenanthrene-2-carboxylic acid,
cis 7-methoxy-1-ethyl-2-difluoromethyl-10-methyl-1,2,3,4,9,10-hexahydrophenanthrene-2-carboxylic acid,
cis 7-methoxy-1-ethyl-2-trifluoromethyl-10-methyl-1,2,3, 4,9,10-hexahydrophenanthrene-2-carboxylic acid,
cis 5,7-dihydroxy-1-ethyl-2-chloromethyl-1,2,3,4,9,10-hexahydrophenanthrene-2-carboxylic acid,
cis 5,7-dihydroxy-1-ethyl-2-difluoromethyl-1,2,3,4,9,10-hexahydrophenanthrene-2-carboxylic acid,
cis 5,7-dihydroxy-1-ethyl-2-trifluoromethyl-1,2,3,4,9,10-hexahydrophenanthrene-2-carboxylic acid, and
cis 5,7-dihydroxy-1-ethyl-2-difluoromethyl-10-methyl-1,2,3,4,9,10-hexahydrophenanthrene-2-carboxylic acid, respectively.

Example 20

Part A.—To a mixture of 1 g. of cis 7-methoxy-1-ethyl-2-difluoromethyl - 1,2,3,4,9,10 - hexahydrophenanthrene-2-carboxylic acid and 125 ml. of liquid ammonia is added 0.5 g. of metallic sodium and 7 ml. of aniline. The resulting mixture is stirred for about 1.5 hours. About 2 grams of ammonium chloride is then added with stirring. Then, the reaction mixture is allowed to stand until the ammonia has evaporated. The residue is taken up in water:methylene chloride. The resulting mixture is separated and the aqueous layer is extracted with methylene chloride. The methylene chloride layer and methylene chloride extract are combined, dried and evaporated to furnish cis 7-methoxy - 1 - ethyl - 2 - difluoromethyl-1,2,3,4,9,10,11,12-octahydrophenanthrene - 2 - carboxylic acid.

Similarly, by use of the above hydrogenation procedure, the other 1,2,3,4,9,10-hexahydrophenanthrene compounds described above (Example 19) are converted into the corresponding 1,2,3,4,9,10,11,12 - octahydrophenanthrene compound, e.g.:

cis 7-methoxy-1-ethyl-2-chloromethyl-10-methyl-1,2,3-4,9,10,11,12-octahydrophenanthrene-2-carboxylic acid,
cis 7-methoxy-1-ethyl-2-difluoromethyl-10-methyl-1,2,3,4,9,10,11,12-octahydrophenanthrene-2-carboxylic acid,
cis 7-methoxy-1-ethyl-2-trifluoromethyl-10-methyl-1,2,3,4,9,10,11,12-octahydrophenanthrene-2-carboxylic acid,
cis 5,7-dihydroxy-1-ethyl-2-chloromethyl-1,2,3,4,9,10,11,12-octahydrophenanthrene-2-carboxylic acid,
cis 5,7-dihydroxy-1-ethyl-2-difluoromethyl-1,2,3,4,9,10,11,12-octahydrophenanthrene-2-carboxylic acid,
cis 5,7-dihydroxy-1-ethyl-2-trifluoromethyl-1,2,3,4,9,10,11,12-octahydrophenanthrene-2-carboxylic acid, and
cis 5,7-dihydroxy-1-ethyl-2-difluoromethyl-10-methyl-1,2,3,4,9,10,11,12-octahydrophenanthrene-2-carboxylic acid.

Part B.—Two milliliters of dihydropyran are added to a solution of 1 g. of the methyl ester of cis 7-methoxy-1-ethyl - 2 -hydroxymethyl - 1,2,3,4,9,10 - hexahydrophenanthrene-2-carboxylic acid in 15 ml. of benzene. About 1 ml. is removed by distillation to remove moisture and 0.4 g. of p-toluenesulfonic acid is added to the cooled solution. The reaction mixture is allowed to stand at room temperature for four days, washed with aqueous sodium bicarbonate solution, with water, dried and evaporated to dryness to yield the methyl ester of cis 7-methoxy - 1 - ethyl - 2 - (tetrahydropyran-2'-yloxymethyl)-1,2,3,4,9,10-hexahydrophenanthrene-2-carboxylic acid.

The procedure of Part A is then repeated using the thus prepared 2-(tetrahydropyran-2'-yloxymethyl) compound as the starting material and there is obtained the methyl ester of cis 7 - methoxy - 1 - ethyl-2-(tetrahydropyran-2'-yloxymethyl) - 1,2,3,4,9,10,11,12-octahydrophenanthrene-2-carboxylic acid.

A mixture of 0.5 g. of the latter compound in 25 ml. of acetone and 0.1 ml. of concentrated hydrochloric acid is held at room temperature for 15 hours, and then poured into water. This mixture is extracted with several portions of methylene chloride. The organic extracts are combined, washed with water to neutrality, dried and evaporated to dryness to yield the methyl ester of cis 7-methoxy - 1 - ethyl - 2 - hydroxymethyl-1,2,3,4,9,10,11,12-octahydrophenanthrene-2-carboxylic acid which may be recrystallized from acetone:hexane.

To a mixture of 1 g. of the methyl ester of cis 2-hydroxymethyl - 1,2,3,4,9,10,11,12 - octahydrophenanthrene-2-carboxylic acid in 60 ml. of methanol, there is added a solution of 1 g. potassium carbonate in 6 ml. of water. The reaction mixture is held at reflux for one hour, cooled, and diluted with water. The solid which forms is collected by filtration, washed with water and dried to yield cis 2-hydroxymethyl-1,2,3,4,9,10,11,12-octahydrophenanthrene-2-carboxylic acid.

Example 21

A solution of 50 mg. of 3-methoxy-13-hydroxymethyl-15 - methyl - 16 - oxagona - 1,3,5(10),6,8,14-hexaen-17-one in 5 ml. of ethyl acetate is hydrogenated with 30 mg. of pre-hydrogenated platinum oxide catalyst for 18 hours at room temperature. The reaction mixture is then filtered and the filtrate is evaporated to afford a mixture of cis 7 - methoxy - 1 - ethyl - 2 - hydroxymethyl-1,2,3,4-tetrahydrophenanthrene - 2 - carboxylic acid and cis 3-methoxy - 13 - hydroxymethyl - 15ξ - methyl-6-oxa-14β-gona - 1,3,5(10),6,8 - pentaen - 17 - one which is separated by preparative chromatography on silica gel using ethyl acetate:hexane (2:8) as eluant. The cis 7-methoxy-1 - ethyl - 2 - hydroxymethyl - 1,2,34 - tetrahydrophenanthrene - 2 - carboxylic acid can be further purified by recrystallization from methanol, if desired.

By repeating the above precedure with the exception of using an equivalent amount of other 16-oxa compounds of the present invention (see Examples 12 and 13, for example) as the starting material in place of 3-methoxy-13 - hydroxymethyl - 15 - methyl - 16 - oxagona-1,3,5(10),6,8,14 - hexaen - 17 - one, the corresponding cis acids and cis saturated lactones are obtained.

Example 22

A mixture of 670 mg. of 3 - methoxy - 13 - fluoro-15-methyl - 16 - oxagona - 1,3,5(10),6,8,14-hexaen-17-one in 70 ml. of dioxane and 45 ml. of 0.1 N aqueous sodium hydroxide is allowed to stand at 20° C. for 36 hours. The solvents are then removed by evaporation under reduced pressure. The resulting residue is diluted with water and acidified by adding dilute hydrochloric acid. This aqueous mixture is extracted several times with ether. The ether extracts are combined and then evaporated to dryness to yield an oil containing a mixture of trans 7 - methoxy - 1 - acetyl - 2-fluoro-1,2,3,4-tetrahydrophenanthrene - 2 - carboxylic acid and 3 - methoxy-13 - fluoro - 15ξ - hydroxy - 16 - oxa - 14β-gona-1,3,5(10),6,8-pentaen-17-one. The oil is recrystallized from benzene:hexane to yield the trans acid as the first-crop. Upon concentration of the mother liquors, the 3 - methoxy - 13-fluoro - 15ξ - methyl - 15ξ - hydroxy-16-oxa-14β-gona-1,3,5(10),6,8-pentaen-17-one is obtained.

The thus-prepared trans acid and lactol are illustrated by the following formulas.

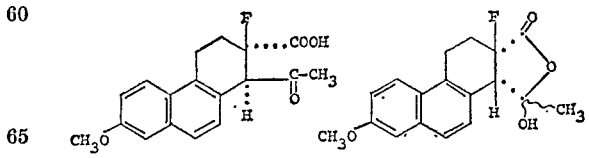

Similarly, using the other 16-oxa steroids of the present invention (see Examples 7 and 9-13) as the starting material, the corresponding trans acid and lactol are obtained, e.g. trans 7 - methoxy - 1 - acetyl - 2 - fluoro-1,2,3,4,9,10-hexahydrophenanthrene - 2 - carboxylic acid and 3 - methoxy - 13 - fluoro - 15ξ - methyl - 15ξ-hydroxy-16 - oxa - 14β - gona - 1,3,5(10),8 - tetraen - 17-one and trans 5,7 - dihydroxy - 1 - acetyl - 2 - difluoromethyl - 1,2,3,4,9,10 - hexahydrophenanthrene - 2 - carboxylic acid and 1,3 - dihydroxy - 13 - difluoromethyl-15ξ - methyl - 15ξ - hydroxy-16-oxa-14β-gona-1,3,5(10), 8 - tetraen - 17 - one are obtained from 3-methoxy-13-fluoro - 15 - methyl - 16 - oxagona - 1,3,5(10),8,14-pentaen - 17 - one and 1,3 - dihydroxy - 13-difluoromethyl - 15 - methyl - 16 - oxagona - 1,3,5(10),8,14-pentaen-17-one, respectively.

By subjecting the thus-obtained trans keto acids to the reduction procedure of Example 16, there is obtained the trans free acid, e.g. trans 7 - methoxy - 1 - ethyl - 2 - fluoro - 1,2,3,4-tetrahydrophenanthrene-2-carboxylic acid, trans 7 - methoxy - 1 - ethyl - 2 - fluoro - 1,2,3,4,9,10-hexahydrophenanthrene - 2 - carboxylic acid and trans 5,7 - dihydroxy - 1 - ethyl - 2 - difluoromethyl-1,2,3,4,9,10-hexahydrophenanthrene-2-carboxylic acid.

By subjecting the above hexahydrophenanthrenes to the process of Example 20 (Part A), the corresponding octahydrophenanthrenes are obtained, e.g. trans 7-methoxy - 1 - ethyl - 2 - fluoro - 1,2,3,4,9,10,11,12-octahydrophenanthrene - 2 - carboxylic acid and trans 5,7 - dihydroxy - 1-ethyl - 2-difluoromethyl-1,2,3,4,9,10,11,12-octahydrophenanthrene-2-carboxylic acid.

Example 23

A mixture of 200 mg. of 3 - methoxy - 13 - fluoro-15ξ-methyl - 15ξ - hydroxy - 16 - oxa-14β-gona-1,3,5(10),6,8-pentaen - 17 - one, 1 g. of sodium carbonate, 1 ml. of methyl iodide and 20 ml. of dimethyl acetamide is stirred in the dark for five hours. After this time, excess mixture is removed by evaporation under reduced pressure. The reaction mixture is then poured into water and the aqueous solution is extracted several times with ether. The combined ether extracts are washed with water, 5% aqueous sodium thiosulfate solution, dried and evaporated to yield the methyl ester of cis 7-methoxy-1-acetyl-2-fluoro-1,2,3,4-tetrahydrophenanthrene-2-carboxylic acid.

Similarly, the other lactols of the present invention can be converted into the corresponding phenanthrene-2-carboxylic acid esters.

Example 24

A solution of 1 g. of cis 1-ethyl-2-chloromethyl-7-methoxy-1,2,3,4-tetrahydrophenanthrene-2-carboxylic acid in 20 ml. of carbon tetrachloride is allowed to react with 2 g. of triphenylphosphine. The reaction mixture is held at 25° C. for a period of 12 hours. The mixture is then poured into ice water, filtered and the product is extracted with ether. The ether extracts are dried and evaporated to dryness to yield cis 1 - ethyl-2-chloromethyl-7-methoxy-1,2,3,4-tetrahydrophenanthrene-2-carboxylic acid chloride which is purified by chromatography over Florisil (synthetic magnesium silicate) and recrystallized from acetone:hexane.

By use of the foregoing procedure, other phenanthrene-2-carboxylic acids of the present invention can be converted into the acid chloride.

Example 25

A solution of 1 g. of cis 1-ethyl-2-trifluoromethyl-7-methoxy - 1,2,3,4 - tetrahydrophenanthrene-2-carboxylic acid in 30 ml. of anhydrous methylene chloride is allowed to stand with 1 g. of N-(2-chloro-1,1,2-trifluoroethyl) diethylamine. The reaction mixture is heated at reflux for a period of five hours. The mixture is then poured into ice water, filtered and extracted with ether. The ether extracts are combined, dried and evaporated to dryness to yield cis 1-ethyl - 2 - trifluoromethyl-7-methoxy-1,2,3,4-tetrahydrophenanthrene-2-carboxylic acid fluoride which is recrystallized from acetone:hexane.

By repeating the above process using as the starting material the other phenanthrene-2-carboxylic acids of the present invention, the corresponding acid fluorides are obtained.

Example 26

A mixture of 1 g. of methyl ester of cis 1-ethyl-2-difluoromethyl-7-methoxy-1,2,3,4 - tetrahydrophenanthrene-2-carboxylic acid in 20 ml. of anhydrous tetrahydrofuran is cooled to —75° C. in a Dry Ice-acetone bath and treated with a previously cooled solution of 0.6 g. of lithium aluminum t-hydride in 20 ml. of anhydrous tetrahydrofuran. The reaction mixture is then allowed to warm to room temperature and then heated at reflux for 15 minutes. The reaction mixture is then cooled and poured into ice water and extracted several times with ethyl acetate. The ethyl acetate extracts are combined, washed with water to neutrality, dried and evaporated to dryness to yield cis 1-ethyl - 2 - difluoromethyl-2-hydroxymethyl-7-methoxy-1,2,3,4 - tetrahydrophenanthrene which may be further purified through recrystallization from acetone: hexane.

The above-prepared 2 - hydroxymethyl compound is represented by the following formula:

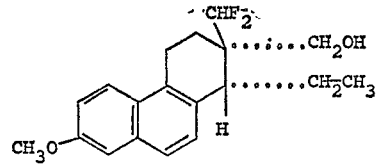

By repeating the above procedure, other 2-hydroxymethyl compounds can be prepared using as the starting material other 2-carboxylic acid methyl esters of the present invention.

Example 27

To a solution of 1 g. of cis 7-methoxy-1-ethyl-2-chloromethyl-2-hydroxymethyl-1,2,3,4 - tetrahydrophenanthrene in 25 ml. of pyridine, previously cooled to 0° C., there is added dropwise a cooled solution (0° C.) of 1 g. of chromic trioxide in 25 ml. of pyridine. The resulting reaction mixture is held at 0° C. for a period of 24 hours, diluted with ethyl acetate and filtered through diatomaceous earth. The filtrate is washed with water, dried and evaporated to yield cis 7-methoxy-1-ethyl-2-chloro-methyl-2-formyl-1,2,3,4-tetrahydrophenanthrene which can be recrystallized from acetone:hexane.

In a similar manner, the other 2-hydroxymethyl compounds of the present invention can be converted into the corresponding 2-formyl compounds.

Example 28

A solution of 1 g. of cis 1-ethyl-2-trifluoromethyl-7-methoxy-1,2,3,4-tetrahydrophenanthrene - 2 - carboxylic acid, 2 ml. of thionyl chloride in 20 ml. of benzene is held at reflux for a period of two hours. The reaction mixture is cooled and evaporated. The residue is dissolved in anhydrous dioxane and the solution saturated with a stream of anhydrous ammonia. Water is then added after 24 hours and the product isolated by filtration to afford cis 1 - ethyl-2-trifluoromethyl-7-methoxy-1,2,3,4-tetrahydrophenanthrene-2-carboxylic acid amide which can be purified by recrystallization, if desired.

By subjecting the other phenanthrene-2-carboxylic acids of the present invention to the above process, the corresponding acid amides can be obtained.

Example 29

Four ml. of dihydropyran is added to a solution of 1 g. of cis 5,7-dihydroxy-1-ethyl-2-chloromethyl - 1,2,3,4,9,10, 11,12-octahydrophenanthrene - 2 - carboxylic acid in 15 ml. of benzene. About 1 ml. is removed by distillation to remove moisture and 0.4 g. of p-toluenesulfonic acid is added to the cooled solution. This mixture is allowed to stand at room temperature for four days. The mixture is then washed with aqueous sodium bicarbonate solution and water, dried and evaporated to give cis 5,7-bis (tetrahydropyran-2'-yloxy)-1-ethyl - 2 - chloromethyl-1, 2,3,4,9,10,11,12-octahydrophenanthrene - 2 - carboxylic acid which can be purified, if desired, by chromatography.

By repeating the procedure of this example using dihydrofuran in place of dihydropyran, the corresponding tetrahydrofuranyl ether is obtained.

Example 30

A mixture of 1 g. of cis 5,7-dihydroxy-1-ethyl-2-difluoromethyl-1,2,3,4,9,10,11,12 - octahydrophenanthrene - 2-carboxylic acid, 4 ml. of pyridine and 4 ml. of acetic anhydride is allowed to stand at room temperature for 15 hours. The mixture is then poured into ice water and the solid which forms is collected by filtration, washed with water and dried to yield cis 5,7-diacetoxy-1-ethyl-2-difluoromethyl-1,2,3,4,9,10,11,12 - octahydrophenanthrene-2-carboxylic acid.

Similarly, by using an equivalent amount of other lower carboxylic anhydrides in place of acetic anhydride, for example, propionic anhydride, n-butyric anhydride, n-caproic anhydride, trimethylacetic anhydride, and the like, the corresponding ester is obtained.

Example 31

A solution of one chemical equivalent of cis 7-hydroxy-1-ethyl-2 - trifluoromethyl - 1,2,3,4 - tetrahydrophenanthrene-2-carboxylic acid in 30 ml. of benzene is heated to reflux and about 2 ml. removed by distillation to eliminate moisture. The mixture is cooled to room temperature and two chemical equivalents of sodium hydride are added, followed by dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield cis 7-cyclopentyloxy - 1 - ethyl-2-trifluoromethyl-1,2,3,4 - tetrahydrophenanthrene - 2 - carboxylic acid which is further purified upon recrystallization from pentane.

By repeating the above procedure using an equivalent amount of cyclohexyl bromide in place of cyclopentyl bromide, there is obtained cis 7-cyclohexyloxy-1-ethyl-2-trifluoromethyl - 1,2,3,4 - tetrahydrophenanthrene - 2 - carboxylic acid.

The above process is repeated using an equivalent amount of the methyl ester of cis 7-hydroxy-2-fluoro-1-ethyl-1,2,3,4-tetrahydrophenanthrene-2-carboxylic acid as the starting material and the corresponding 7-cyclopentyl ether is obtained which can be subjected to the process of Example 17 to obtain the free acid.

Example 32

The process of Example 8 is repeated using the methyl ester of cis 7-methoxy-1-ethyl-2-hydroxymethyl - 1,2,3,4-tetrahydrophenanthrene-2-carboxylic acid as the starting material and there is obtained the methyl ester of cis 7-methoxy - 1 - ethyl-2-formyl-1,2,3,4 - tetrahydrophenanthrene-2-carboxylic acid which is then subjected to the process of Example 17 to afford the free acid.

What is claimed is:

1. A compound selected from the group consisting of those of the following Formulas A and B:

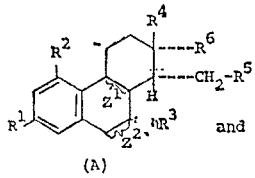 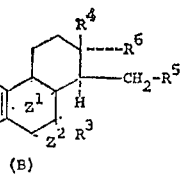

(A) and (B)

wherein, $R^1$ is hydroxy, lower alkoxy, or lower hydrocarbon carboxylic acyloxy of up to 6 carbon atoms;
$R^2$ is lower alkyl or hydrogen;
$R^3$ is hydrogen, methyl, or ethyl;
$R^4$ is fluoromethyl, chloromethyl, bromomethyl, difluoromethyl, dichloromethyl, trifluoromethyl, or trichloromethyl;
$R^5$ is hydrogen, methyl, ethyl or propyl;
$R^6$ is the group

wherein R is hydrogen or lower alkyl;
$Z^1$ is a carbon-carbon single bond or double bond between C–11 and C–12; and
$Z^2$ is a carbon-carbon single bond or double bond between C–9 and C–10, provided that when $Z^2$ is a double bond that $Z^1$ is a double bond.

2. A compound according to claim 1 wherein,
$R^1$ is hydroxy, methoxy or lower hydrocarbon carboxylic acyloxy of up to 6 carbon atoms;
$R^2$ is hydrogen;
$R^3$ is hydrogen or methyl;
$R^4$ is chloromethyl, difluoromethyl, or trifluoromethyl;
$R^5$ is methyl; and
$R^6$ is the group

wherein R is hydrogen or methyl.

3. A compound according to Formula A of claim 1 wherein,
$R^1$ is methoxy;
$R^2$ is hydrogen;
$R^3$ is hydrogen;
$R^5$ is methyl;
$R^6$ is the group

wherein R is hydrogen;
$Z^1$ is a double bond; and
$Z^2$ is a double bond.

4. A compound according to Formula A of claim 1 wherein,
$R^1$ is methoxy;
$R^2$ is hydrogen;
$R^3$ is α-methyl;
$R^4$ is chloromethyl, difluoromethyl, or trifluoromethyl;
$R^5$ is methyl;
$R^6$ is the group

wherein R is hydrogen;
$Z^1$ is a single bond; and
$Z^2$ is a single bond.

5. A compound according to Formula A of claim 1 wherein,
$R^1$ is methoxy;
$R^2$ is hydrogen;
$R^3$ is hydrogen;
$R^4$ is trifluoromethyl or chloromethyl;
$R^5$ is methyl;
$R^6$ is the group

wherein R is hydrogen;
$Z^1$ is a double bond; and
$Z^2$ is a double bond.

6. A compound according to Formula A of claim 1 wherein,
$R^1$ is methoxy;
$R^2$ is methyl;
$R^3$ is hydrogen;
$R^4$ is dichloromethyl;
$R^5$ is methyl;
$R^6$ is the group

wherein R is hydrogen;

$Z^1$ is a double bond; and
$Z^2$ is a double bond.

7. A compound according to Formula A of claim 1 wherein,
$R^1$ is hydroxy;
$R^2$ is hydrogen;
$R^3$ is hydrogen;
$R^4$ is chloromethyl, difluoromethyl, or trifluoromethyl;
$R^5$ is methyl;
$R^6$ is the group

wherein R is hydrogen;
$Z^1$ is a single bond; and
$Z^2$ is a single bond.

8. A compound according to Formula A of claim 1 wherein,
$R^1$ is hydroxy;
$R^2$ is hydrogen;
$R^3$ is α-methyl;
$R^4$ is difluoromethyl;
$R^5$ is methyl;
$R^6$ is the group

wherein R is hydrogen;
$Z^1$ is a single bond; and
$Z^2$ is a single bond.

9. A compound according to Formula B of claim 1, wherein,
$R^1$ is hydroxy;
$R^2$ is hydrogen;
$R^3$ is hydrogen;
$R^4$ is difluoromethyl;
$R^5$ is methyl;
$R^6$ is the group

wherein R is hydrogen;
$Z^1$ is a single bond; and
$Z^2$ is a single bond.

10. A compound according to claim 1 of Formula A wherein $R^1$ is methoxy, $R^2$ is hydrogen, $R^3$ is hydrogen, $R^4$ is trifluoromethyl, $R^5$ is methyl, $R^6$ is the group

wherein R is hydrogen; $Z^1$ is a double bond; and $Z^2$ is a double bond.

References Cited

UNITED STATES PATENTS 3,706,781  12/1972  Marx et al. _____ 260—468.5
3,318,922  3/1967  Windholz et al. ____ 260—397.4

OTHER REFERENCES

Burger: Medicinal Chem. p. 235 (1970).
Fieser, et al.: Steroids, 1959, pp. 491–2.
Yale: J. Med. & Pharm. Chem. I. 121 (1959).

LORRAINE A. WEINBERGER, Primary Examiner

R. GERSTL, Assistant Examiner

U.S. Cl. X.R.

260—343.3, 343.6, 345.7, 345.8, 345.9, 347.3, 347.4, 347.8, 465 D, 465 F, 468.5, 479 R, 488 CD, 544 F, 514 M, 588 R, 559 R, 580 H, 599, 613 R; 424—308, 317, 315, 324